(12) United States Patent
Marin

(10) Patent No.: US 12,017,802 B2
(45) Date of Patent: Jun. 25, 2024

(54) DEBRIS COLLECTING APPARATUS AND RELATED METHOD

(71) Applicant: Frank David Fulfs Marin, Ballston Lake, NY (US)

(72) Inventor: Frank David Fulfs Marin, Ballston Lake, NY (US)

(*) Notice: Subject to any disclaimer, the term of this patent is extended or adjusted under 35 U.S.C. 154(b) by 357 days.

(21) Appl. No.: 17/208,452

(22) Filed: Mar. 22, 2021

(65) Prior Publication Data

US 2021/0292010 A1 Sep. 23, 2021

Related U.S. Application Data

(60) Provisional application No. 62/993,247, filed on Mar. 23, 2020.

(51) Int. Cl.
*B64G 1/10* (2006.01)
*B64G 1/24* (2006.01)
*B64G 1/36* (2006.01)
*B64G 1/44* (2006.01)

(52) U.S. Cl.
CPC ........... *B64G 1/1078* (2013.01); *B64G 1/242* (2013.01); *B64G 1/36* (2013.01); *B64G 1/443* (2013.01)

(58) Field of Classification Search
CPC ........ B64G 1/1078; B64G 1/242; B64G 1/36; B64G 1/443; B64G 1/66
See application file for complete search history.

(56) References Cited

U.S. PATENT DOCUMENTS

| | | | | |
|---|---|---|---|---|
| 7,815,149 B1* | 10/2010 | Howard | ............... | B64G 1/646 |
| | | | | 244/172.4 |
| 8,882,048 B2* | 11/2014 | Levin | ............... | B64G 1/648 |
| | | | | 244/172.4 |
| 9,434,485 B1* | 9/2016 | Lehocki | ............... | B64G 1/646 |
| 2005/0258311 A1* | 11/2005 | Scott | ............... | B64G 1/244 |
| | | | | 244/172.4 |
| 2011/0192936 A1* | 8/2011 | Knirsch | ............... | B64G 1/1078 |
| | | | | 244/158.2 |
| 2015/0053823 A1* | 2/2015 | Bigelow | ............... | B64G 1/402 |
| | | | | 244/172.4 |
| 2018/0019520 A1* | 1/2018 | Hildebrand | ............ | H01Q 1/081 |
| 2018/0346153 A1* | 12/2018 | Kaplan | ............... | B64G 1/242 |
| 2019/0241286 A1* | 8/2019 | Goff | ............... | B64G 4/00 |

* cited by examiner

*Primary Examiner* — Medhat Badawi
*Assistant Examiner* — Vicente Rodriguez
(74) *Attorney, Agent, or Firm* — Barclay Damon LLP

(57) ABSTRACT

A method for collecting orbital debris comprises detecting a piece of orbital debris approaching a front end of a debris collecting apparatus. An electromagnet is activated and acts to slow or stop rotation of the orbital debris and to attract the orbital debris to the collecting zone. The orbital debris is secured and the orbit of the debris collecting apparatus is changed to a decaying orbit in order to move the debris collecting apparatus out of LEO and closer to Earth. The debris collecting apparatus remains in the decaying orbit until a predetermined altitude is reached at which point the orbital debris is released from the collecting zone to continue along the decaying orbit such that it enters Earth's atmosphere. The debris collecting apparatus is then moved out of the decaying orbit and returned to a stable LEO.

19 Claims, 24 Drawing Sheets

DEBRIS COLLECTING APPARATUS AND RELATED METHOD

CROSS-REFERENCE TO RELATED APPLICATIONS

This application is a non-provisional application of, and claims the benefit and priority of, U.S. Provisional Patent Application No. 62/993,247 filed on Mar. 23, 2020. The entire contents of said application is hereby incorporated by reference.

TECHNOLOGICAL FIELD

This invention relates to a debris collecting apparatus, and more specifically a debris collecting apparatus configured to attract, ensnare, and guide orbital debris positioned in a low Earth orbit (LEO), and a related method. The invention further relates to a debris collecting apparatus configured to alter the orbit of orbital debris in LEO in order to cause the orbital debris to enter Earth's atmosphere.

BACKGROUND

Space junk or orbital debris is material that orbits a celestial body such as Earth. Earth's orbital debris is primarily the result of artificial objects left in space and the collisions between such artificial objects. There are about 6,000 tons of orbital debris orbiting Earth comprising millions of objects that vary in size from tiny flecks of paint to large booster rockets. The orbital debris generally enters low Earth orbit (LEO), being located at an altitude of approximately 2,000 km or less. The orbital debris can orbit very fast and may reach speeds of 18,000 mi/hr. Over 500,000 pieces of orbital debris are tracked by NASA and the Department of Defense. FIG. 1 illustrates a representation of pieces of orbital debris 50 (indicated by individual dots) positioned around the Earth 10. (https://www.nasa.gov/sitesidefaultfilesistyles/ubernode_alt_horiz/public/4-8-nrc-evaluates-nasas-orbital-debris-programs.jpg). It can be clearly seen that the majority of the orbital debris 50 is positioned in the LEO 20. The tracking information is used to calculate safe passage of spacecraft traveling to and from Earth and the positioning of satellites to orbit Earth. For example, NASA has a set of long-standing guidelines that are used to assess whether the threat of a close pass of orbital debris is sufficient to warrant evasive action or other precautions to ensure the safety of the crew of the International Space Station (ISS). When predictions indicate that the orbital debris will pass close enough for concern and the quality of the tracking data is deemed sufficiently accurate, mission control centers in Houston and Moscow work together to develop a prudent course of action.

However, not every piece of orbital debris can be tracked and untracked orbital debris threatens the safety of future space missions and satellite longevity. Many spacecrafts, the ISS, and some satellites even have debris shields to help protect from orbital debris. Currently, there are no laws governing the clean-up of orbital debris and the sheer scale of the problem along with the complications of a space operation will make any clean-up dangerous and expensive. As the orbital debris orbits the planet in LEO, it also may separately spin or rotate. This additional rotation makes it especially challenging and dangerous to capture orbital debris. Some have proposed a device that ensnares orbital debris using a net, however trying to ensnare a rotating piece of debris using a net can cause the net to tangle and/or rip. Moreover, the forces of the rotating debris, once captured, can be transferred to the device thereby causing it to be deflected from its orbit. In addition, some pieces of space debris are relatively fragile and contact/physical manipulation using a net may break a single piece of debris into multiple pieces of debris. Other proposed methods face similar challenges.

These are just some of the problems associated with devices and methods used to clean up orbital debris.

SUMMARY

An embodiment of a method for collecting orbital debris using the debris collecting apparatus may comprise detecting a piece of orbital debris approaching the front end of the debris collecting apparatus. The detection step may performed using the one or more sensors, cameras, and processors onboard the debris collecting apparatus in cooperation with each other. Bidirectional communication with a remote server or control device on Earth's surface may enable outside intervention and control of one or more components of the debris collecting apparatus. A plurality of collecting extensions are extended or opened to enable access to the collecting zone and an electromagnet is activated when the detected distance of the debris reaches a predetermined value. The strength of the electromagnet is adjusted depending on the distance from the orbital debris and the size of the orbital debris in order to slow or stop rotation of the orbital debris and to attract the orbital debris to the collecting zone. The electromagnet is deactivated once the rotation of the orbital debris has stopped and the orbital debris is positioned in the collecting zone. The plurality of collecting extensions are articulated such that contact elements of the collecting extensions are in contact with and secure the orbital debris. The orbit of the debris collecting apparatus is changed to a decaying orbit to move the debris collecting apparatus out of LEO and closer to Earth. The debris collecting apparatus remains in the decaying orbit until a predetermined altitude is reached at which point the orbital debris is released to continue along the decaying orbit such that it enters Earth's atmosphere. The debris collecting apparatus is then moved out of the decaying orbit and returns to a stable LEO.

Another embodiment of a method for collecting orbital debris using a debris collecting apparatus comprises detecting a piece of orbital debris approaching a front end of the debris collecting apparatus and enabling access to a collecting zone. An electromagnet is activated when the detected distance reaches a predetermined value. The strength of the electromagnet is controlled depending on the size of the debris and the distance of the debris from the electromagnet, wherein the electromagnet acts to slow or stop rotation of the orbital debris and to attract the orbital debris to the collecting zone. The electromagnet is deactivated once the rotation of the orbital debris has stopped and the orbital debris is positioned in the collecting zone. The orbital debris is secured and the orbit of the debris collecting apparatus is changed to a decaying orbit in order to move the debris collecting apparatus out of LEO and closer to Earth. The debris collecting apparatus remains in the decaying orbit until a predetermined altitude is reached at which point the orbital debris is released from the collecting zone to continue along the decaying orbit such that it enters Earth's atmosphere. The debris collecting apparatus is then moved out of the decaying orbit and returned to a stable LEO.

In an embodiment, the step of detecting of the piece of orbital debris is done using one or more sensors and cameras, wherein the one or more sensors and cameras are configured to communicate with at least one processor. In an embodiment, the at least one processor is configured for bidirectional communication with a control unit or server on Earth's surface to enable control of one or more components of the debris collecting apparatus from Earth. In an embodiment, the step of securing the orbital debris comprises contacting the orbital debris with one or more collecting extensions. In an embodiment, after releasing the orbital debris, the debris collecting apparatus returns to LEO at a predetermined position.

An embodiment of a debris collecting apparatus comprises a body extending along a body axis from a first end to an opposing second end and a propulsion source configured to propel the body. A collecting device is positioned at the first end and comprises an electromagnet and a plurality of extensions positioned around the electromagnet, wherein each of the plurality of extensions is configured to move relative to each other and the body. The debris collecting apparatus further includes at least one rechargeable power source in electrical communication with each of the plurality of extensions and the electromagnet and at least one solar array coupled to the body and comprising a plurality of solar panels, wherein the at least one solar array is in electrical communication with the at least one rechargeable power source. The plurality of extensions and the electromagnet at least partially define a collecting zone.

In an embodiment, at least one of the plurality of extensions comprises a dispenser configured to dispense a high-density foam. In an embodiment, at least one sensor is positioned on the body and configured to determine a distance from a piece of orbital debris. In another embodiment, at least two of the plurality of extensions further comprise a contacting element positioned at a distal end of the extension and configured to contact a piece of orbital debris. In an embodiment, the body further comprises a skirt configured to at least partially define the collecting zone. In an embodiment, the electromagnet and the plurality of extensions are configured to cooperate in order to attract and trap a piece of orbital debris within the collecting zone. In another embodiment, the trapped piece of orbital debris is configured to be positioned and released to enter Earth's atmosphere.

Additional features and advantages of the present disclosure are described in, and will be apparent from, the following Brief Description of the Drawings and Detailed Description.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following description relates to various embodiments of an improved debris collecting apparatus. It will be readily apparent that these embodiments are merely examples and that numerous variations and modifications are possible that embody the inventive aspects discussed herein. Several terms are used throughout this description to describe the salient features of the invention in conjunction with the accompanying figures. These terms, which may include "first", "second", "inner", "outer", and the like are not intended to overly limit the scope of the invention, unless so specifically indicated. The terms "about" or "approximately" as used herein may refer to a range of 80%-125% of the claimed or disclosed value. With regard to the drawings, their purpose is to depict salient features of the debris collecting apparatus and are not specifically provided to scale.

Referring to FIGS. 2-4 and 9-15, the embodiments of the debris collecting apparatus 100, 200, 300, 1000 discussed herein are configured as a satellite that is capable of being carried out of the Earth's atmosphere and orbiting around the Earth (or another celestial body) for a prolonged period of time. However, one or more of the components related to attraction, capture, and release of debris may be fitted to other vehicles such as, but not limited to, trucks, ships, submersibles, and aircraft.

Figure 1:
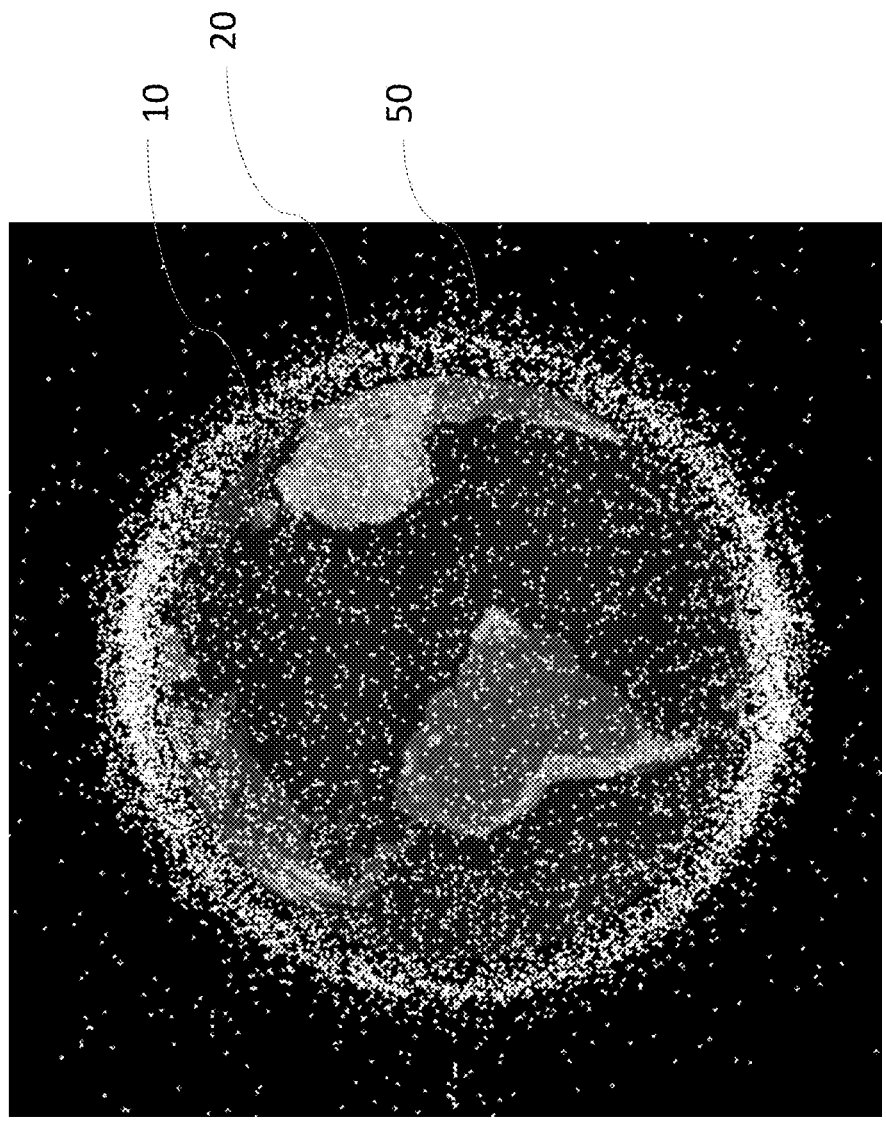
FIG. 1 illustrates a representation of planet Earth with a schematic representation of space debris in LEO.
Figure 2:
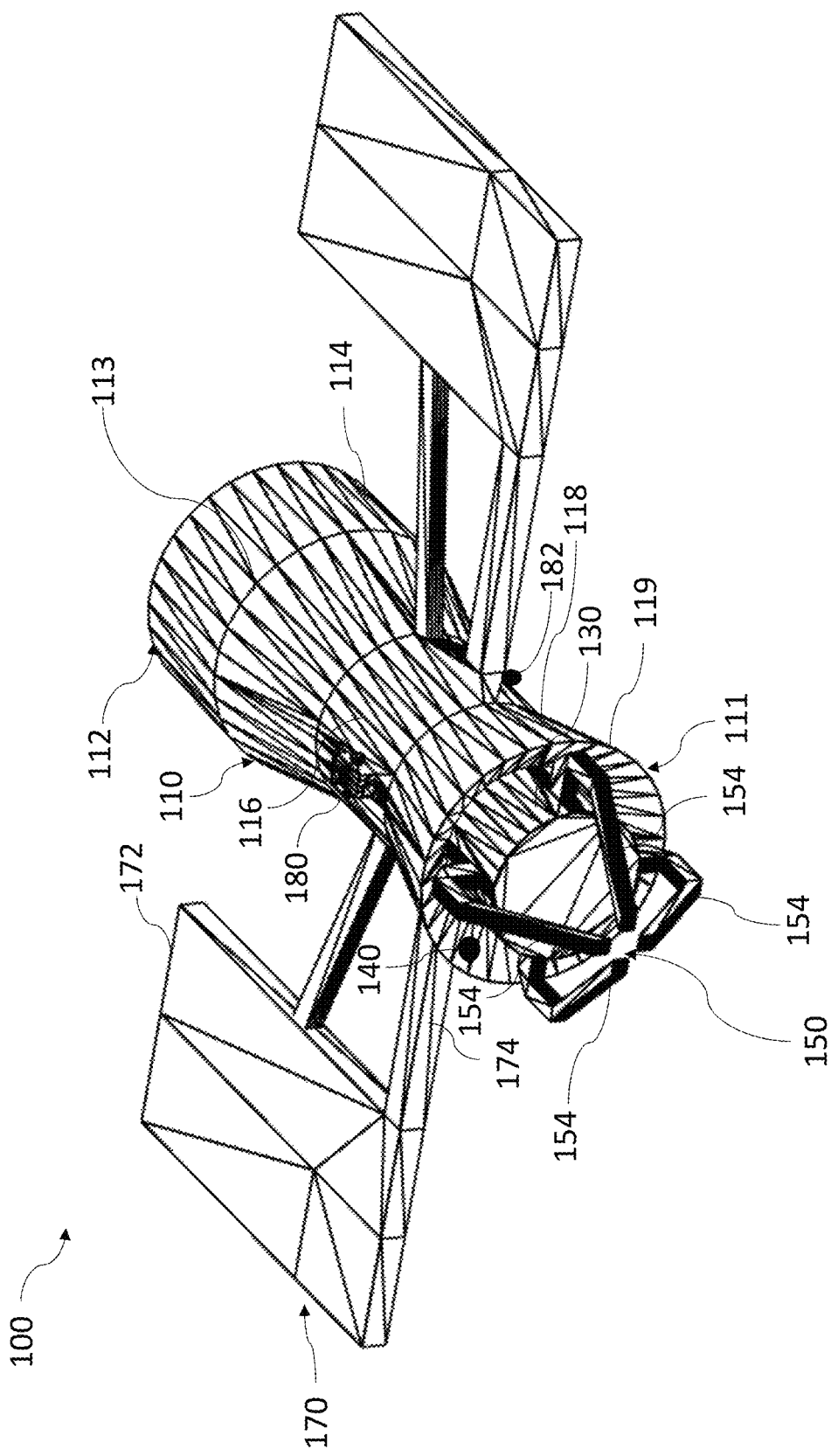
FIG. 2 illustrates a front top perspective view of an embodiment of a debris collecting apparatus.
Figure 3:
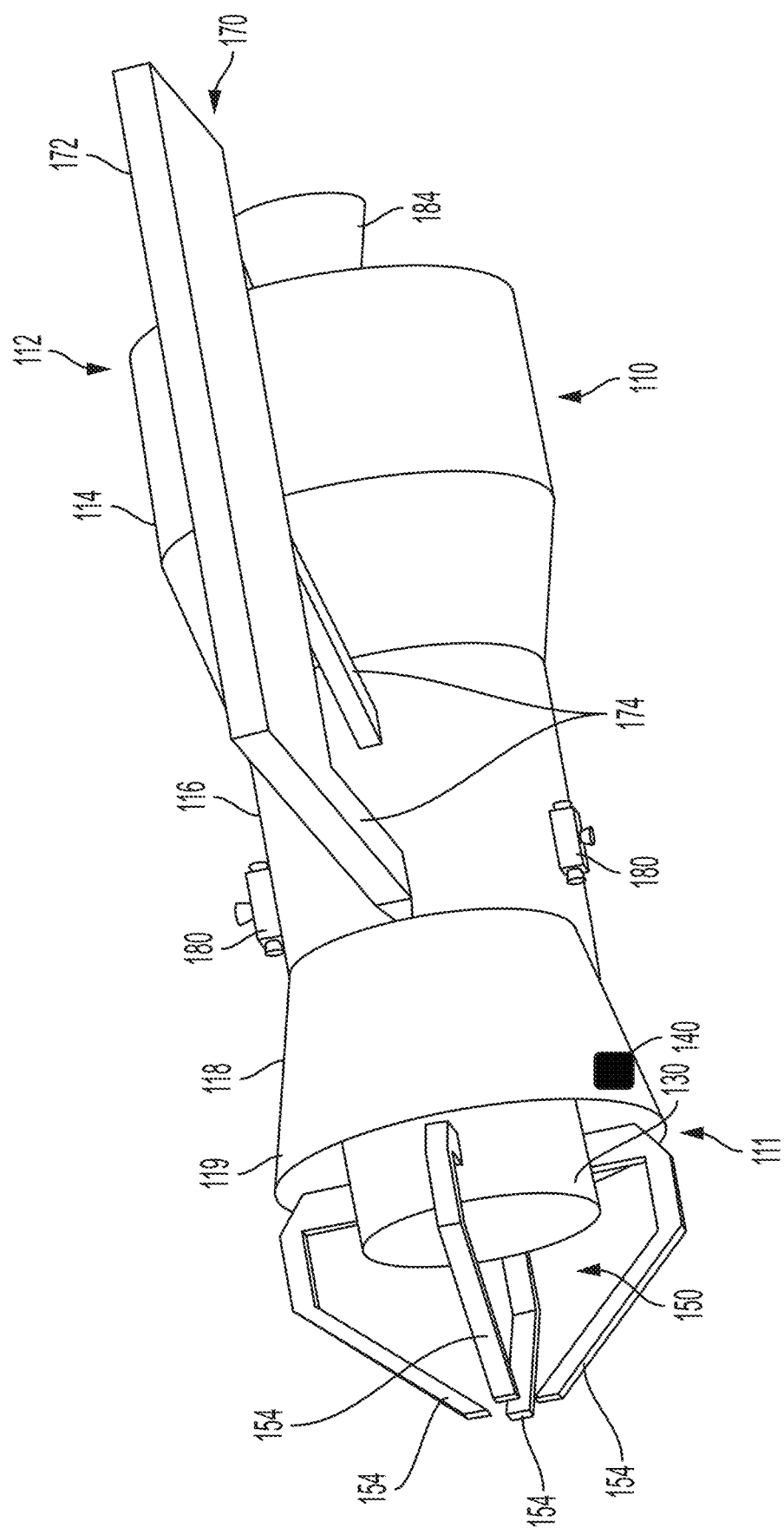
FIG. 3 illustrates a side perspective view of the embodiment of the debris collecting apparatus of FIG. 2.
Figure 4:
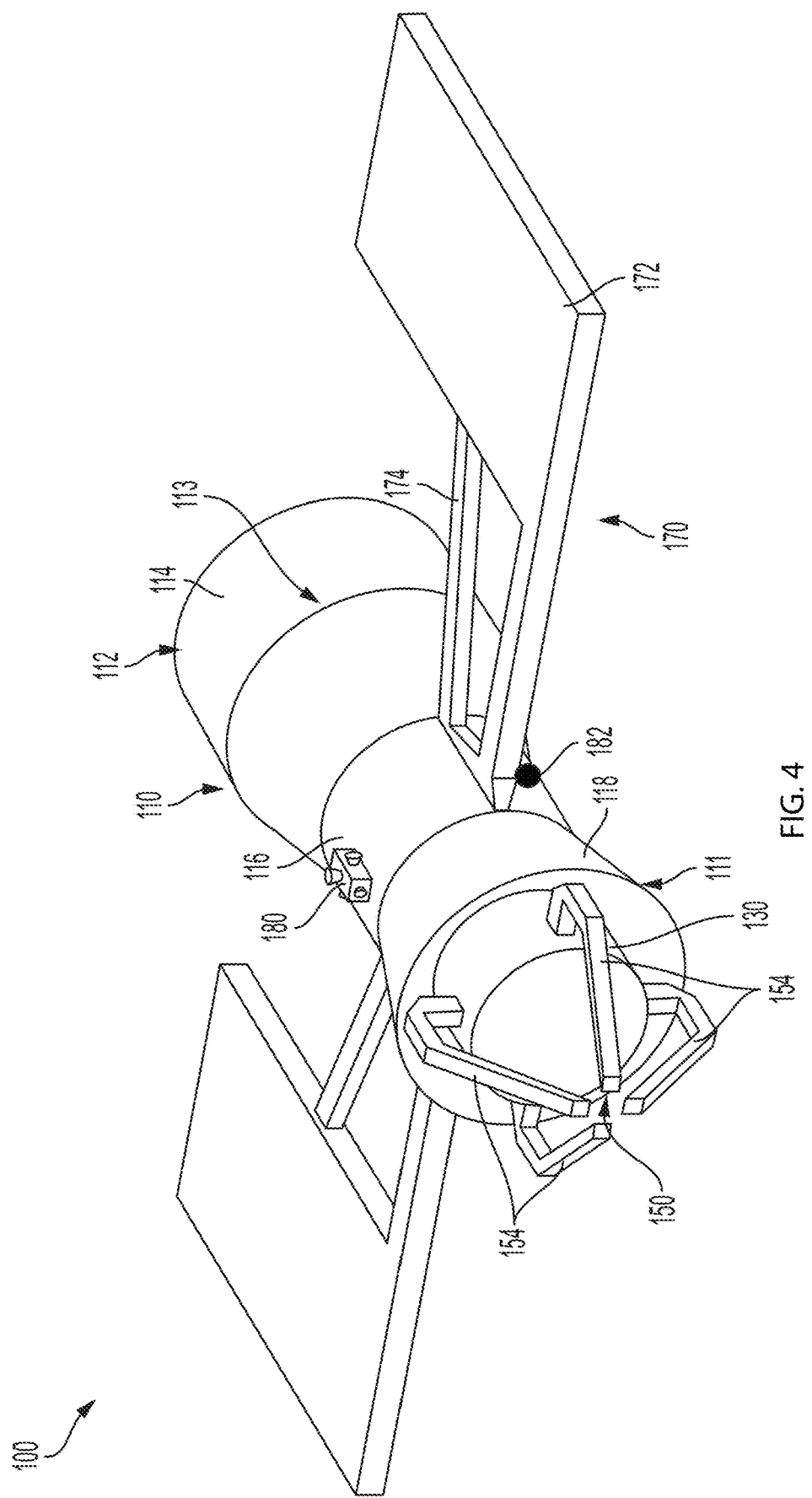
FIG. 4 illustrates a front perspective view of the embodiment of the debris collecting apparatus of FIG. 2.

Turing to the embodiment shown in FIGS. 2-4, the debris collecting apparatus 100 generally comprises a body 110, an electromagnet 130, a plurality of collecting extensions 154, and a power source such as a solar assembly 170 or solar arrangement.

The body 110 may comprise a substantially tubular structure. As shown in FIGS. 2-4, the body 110 comprises a plurality of tubular and frustoconical portions coupled together to define an outer surface 113 or exterior surface, and an inner cavity (not shown). The inner cavity (not shown) may be configured to house or define one or more fuel compartments and/or fuel cells and/or batteries and one or more electrical components configured to actuate components of the debris collecting apparatus 100, control one or more components, enable electrical communication between components of the debris collecting apparatus and/or enable bidirectional communication with a remote server, or control device. It can be appreciated by one skilled in the art that the inner cavity (not shown) may be configured to house a variety of components depending on the nature of the environment the apparatus is in and the nature of the debris to be collected.

Still referring to FIGS. 2-4, the body 110 generally comprises a front end 111 and a rear end 112. As shown, the body 110 may include a rear portion 114 with a main thruster portion that is the portion of the body 110 proximate the rear end 112 of the body 110. The rear portion 114 may be configured to at least partially surround and house a main thruster (or other propulsion device) 184 comprising an exhaust cone 185. A mid portion 116 is coupled to the rear portion 114 and a front portion 118 is coupled to the mid portion 116 such that the rear portion 114 is separated from the front portion 118 by the mid portion 116. The rear portion 114, mid portion 116, and the front portion 118 of the body 110 may comprise varying diameters. As shown in the embodiment of FIGS. 2-4, the mid portion 116 comprises a diameter that is smaller than the rear portion 114 and the front portion 118. The front portion 118 may be generally frustoconical with a diameter that increases from the junction of the mid portion 116 to the front end 111.

An electromagnet 130 is positioned at the front end 111 of the body 110 and is at least partially surrounded and protected by a skirt 119 or a lip. The electromagnet 130 may comprise a variety of shapes and configurations. As shown in several of the depicted embodiments, the electromagnet 130 is generally cylindrical. The electromagnet 130 is electrically coupled to a power supply, such as one or more batteries and is in electrical communication with one or more processors. The one or more processors may be configured to control the strength of the electromagnet 130 as well as activation and deactivation of the electromagnet 130. The one or more processors may be configured for bidirectional communication with a remote server or control device located on the surface of Earth 10 and/or in another vehicle or spacecraft. The electromagnet 130 may further be in communication with one or more sensors 140 positioned on the body 110. The one or more sensors 140 may be, but is not limited to, distance sensors configured to detect or determine the distance of the debris collecting apparatus 100 from a piece of debris 50 in a LEO. The one or more distance sensors may further be in communication with the processors and/or the remote server and/or remote control device. One or more cameras may be positioned on the body 110 and/or one or more of the collecting extensions 154 and configured to obtain and transmit images to the one or more processors as well as the remote server and/or control device. The transmitted images may be used to guide movement of the collecting extensions 154 and or the debris collecting apparatus 100.

Figure 5:
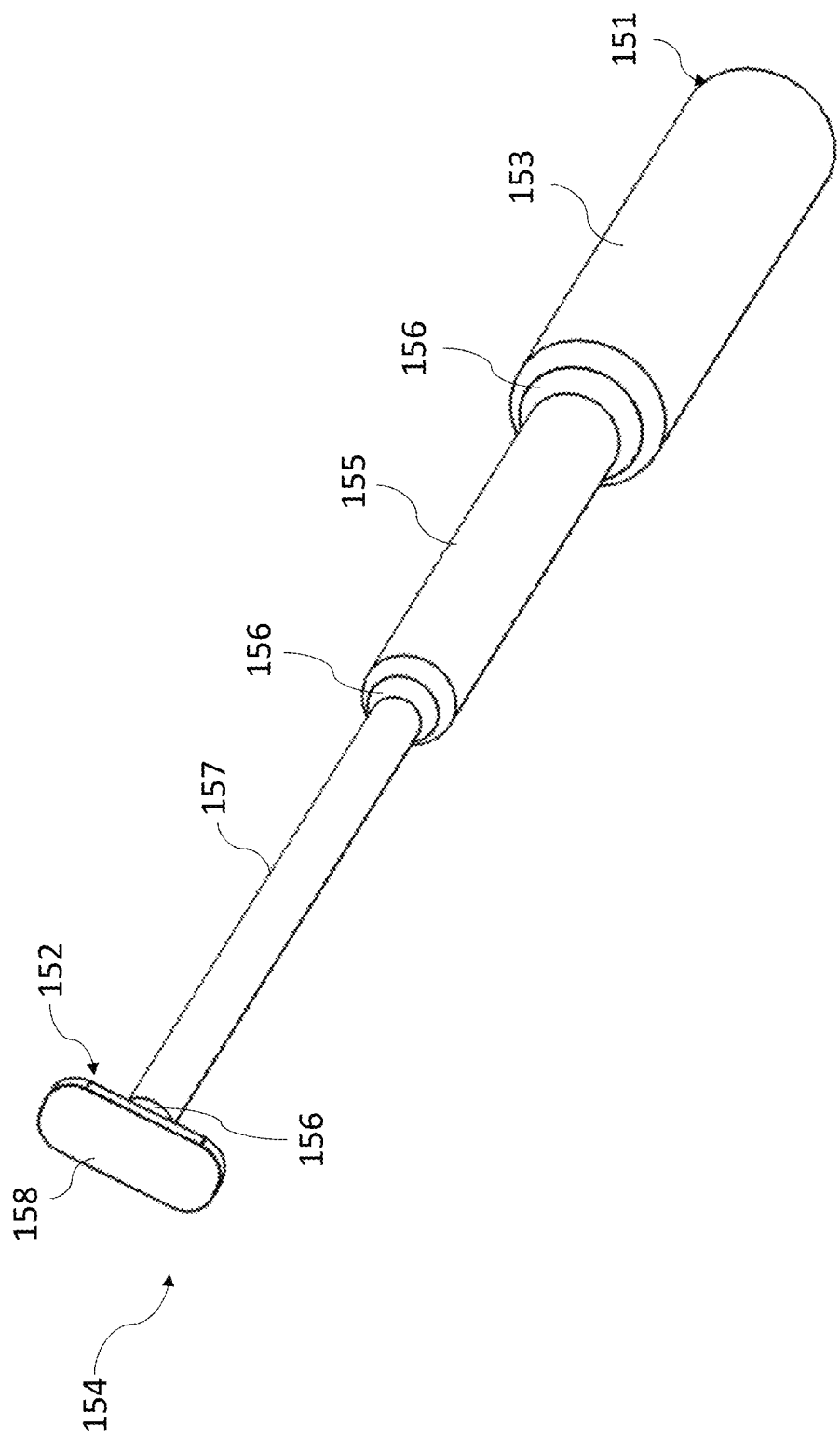
FIG. 5 illustrates a perspective view of an embodiment of a collecting extension of the debris collecting apparatus.
Figure 6:
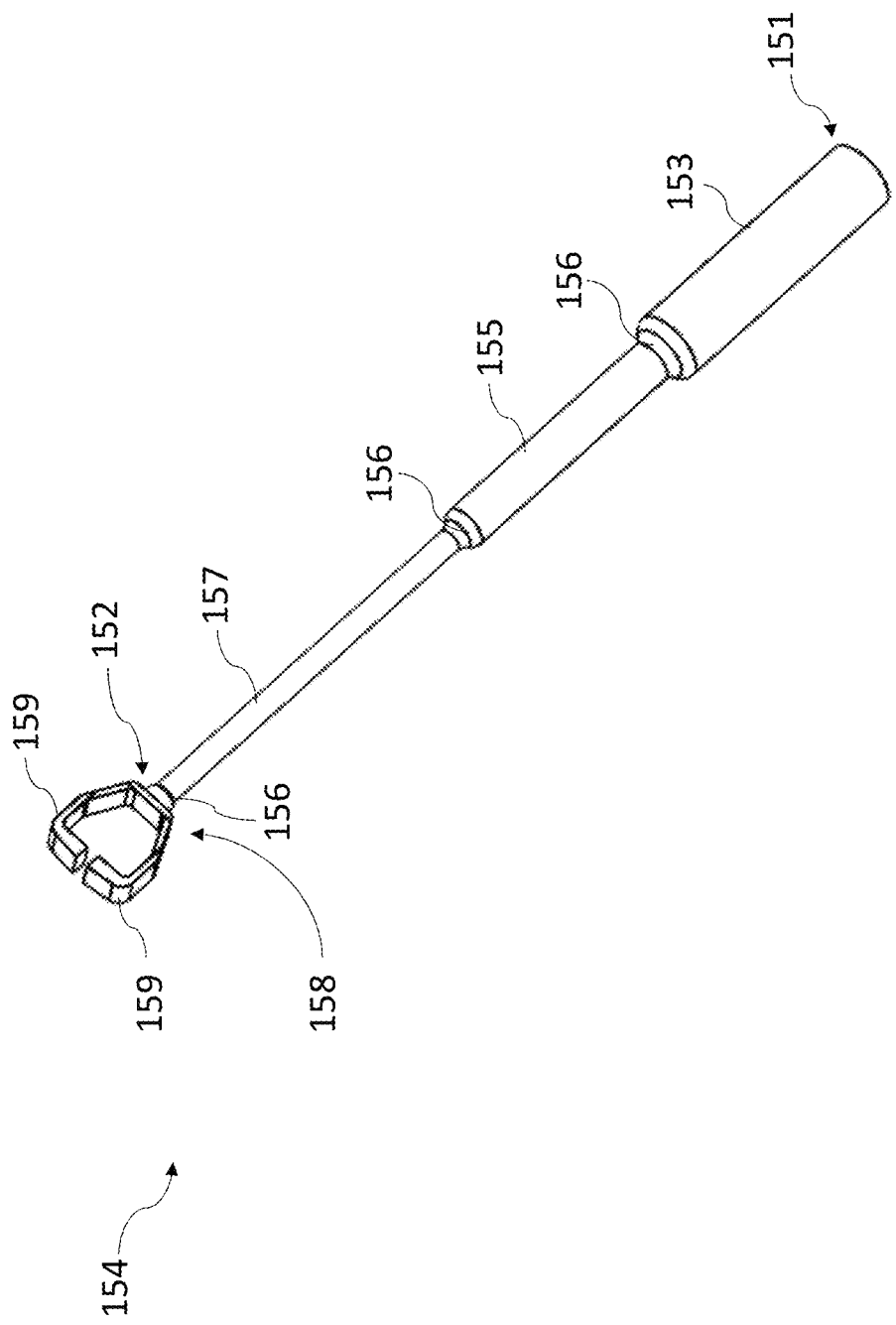
FIG. 6 illustrates a perspective view of another embodiment of a collecting extension of the debris collecting apparatus.

The plurality of collecting extensions 154 are positioned around the skirt 119 or otherwise around the electromagnet 130. Referring to FIGS. 5-6, the collecting extensions 154 generally comprise a proximal end 151 configured to couple to the body 110 or the electromagnet 130 and an opposing distal end 152. As shown in FIGS. 5-6, the collecting extensions 154 further comprise a plurality of portions, such as a first or proximal portion 153, a second or mid portion 155, and a third or distal portion 157. Other embodiments of the collecting extensions 154 may comprise fewer or more portions. One or more of the junctions between the portions 153, 155, 157 may comprise a joint 156, such as a ball joint or other type of joint configured to enable one or more of the portions 153, 155, 157 to move relative to each other. The diameters of the portions 153, 155, 157 may vary with respect to each other. As shown the diameter of the proximal portion 153 is greater than the diameter of the mid portion 155 and the distal portion 157. The portions 153, 155, 157 generally comprise a substantially tubular shape with a circular cross-section, however in other embodiments, the portions 153, 155, 157 may comprise a non-circular cross-section.

The distal end 152 of the collecting extensions 154 may further comprise a securing or contacting element 158 that is configured to contact and otherwise assist in securing a piece of debris 50. Referring specifically to the embodiment shown in FIG. 5, the contacting element 158 may comprise a generally planar surface configured to be placed in contact with the debris 50 such that two or more collecting extensions 154 with said contacting elements 158 may retain a piece of debris 50 by exerting a compressive force on the debris 50 to retain the debris 50 between the two or more contacting elements 158. In other embodiments, the collecting extensions 154 may be configured to pivot such that they "collapse" around debris 50, thereby retaining the debris 50 in a collecting zone 150. Referring to FIG. 6, the contacting element 158 may comprise two or more articulating elements 159 that may be configured to move relative to each other and the collecting extension 154. As shown, the contacting element 158 comprises two opposing articulating elements 159 or arms configured to grasp or secure a piece or a portion of a piece of debris 50. In the embodiments shown, four (4) collecting extensions 154 are positioned around the electromagnet 130, however in other embodiments, fewer or more collecting extensions 154 may be present. The plurality of collecting extensions 154 are electrically coupled to one or more actuators configured to articulate the portions 153, 155, 157 of the collecting extensions 154 and the contacting element 158 with respect to each other and the body 110. The one or more actuators are electrically coupled to a power supply, such as a battery bank, and the one or more processors.

Referring back to FIGS. 2-4, the power supply may be supplied or replenished by a power source or generator. As shown, the power source is supplied by a solar arrangement 170 comprising a plurality of solar panels 172 coupled to the body 110 by one or more supports 174. The one or more supports 174 are configured to hold the plurality of solar panels 172 away from the body 110 of the debris collecting apparatus 100. The plurality of solar panels 172 may be configured to pivot relative to the one or more supports 174 in order to maintain an optimal position relative to solar photons or solar rays in order to efficiently generate power to be fed to the power supply. Accordingly, each of the plurality of solar panels 172 may be coupled to an actuator configured to pivot each solar panel 172 relative to each other. In other embodiments, the plurality of solar panels 172 are arranged in two or more arrays where each array is coupled to an actuator and is configured to move relative to each other and the body 110 of the debris collecting apparatus 100. In another embodiment, the one or more supports 174 are coupled to at least one actuator and configured to pivot relative to the body 110 of the debris collecting apparatus 100. Similar to the actuator(s) of the collecting extensions 154, the actuators associated with the solar arrangement 170 may be electrically coupled to the power supply and the one or more processors.

One or more additional thrusters, such as orbital thruster(s) 180 and directional thruster(s) 182 may be positioned on the exterior surface 113 of the body 110 in addition to the main thruster 184. These thrusters may be configured to alter the orientation of the debris collecting apparatus 100 while in orbit and/or increasing/decreasing orbital velocity and/or changing the orbit of the debris collecting apparatus 100. The thrusters are fluidly coupled to the one or more fuel compartments within the inner cavity (not shown) of the body 110. In the embodiments shown, the thrusters are configured to operate using a combustible fuel source, such as rocket fuel, that is preloaded into the fuel compartments prior to launching the debris collecting apparatus 100 into orbit. In an embodiment, the body 110 may further comprise a refueling device configured to enable refueling of the debris collecting apparatus 100 while in orbit.

Figure 7:
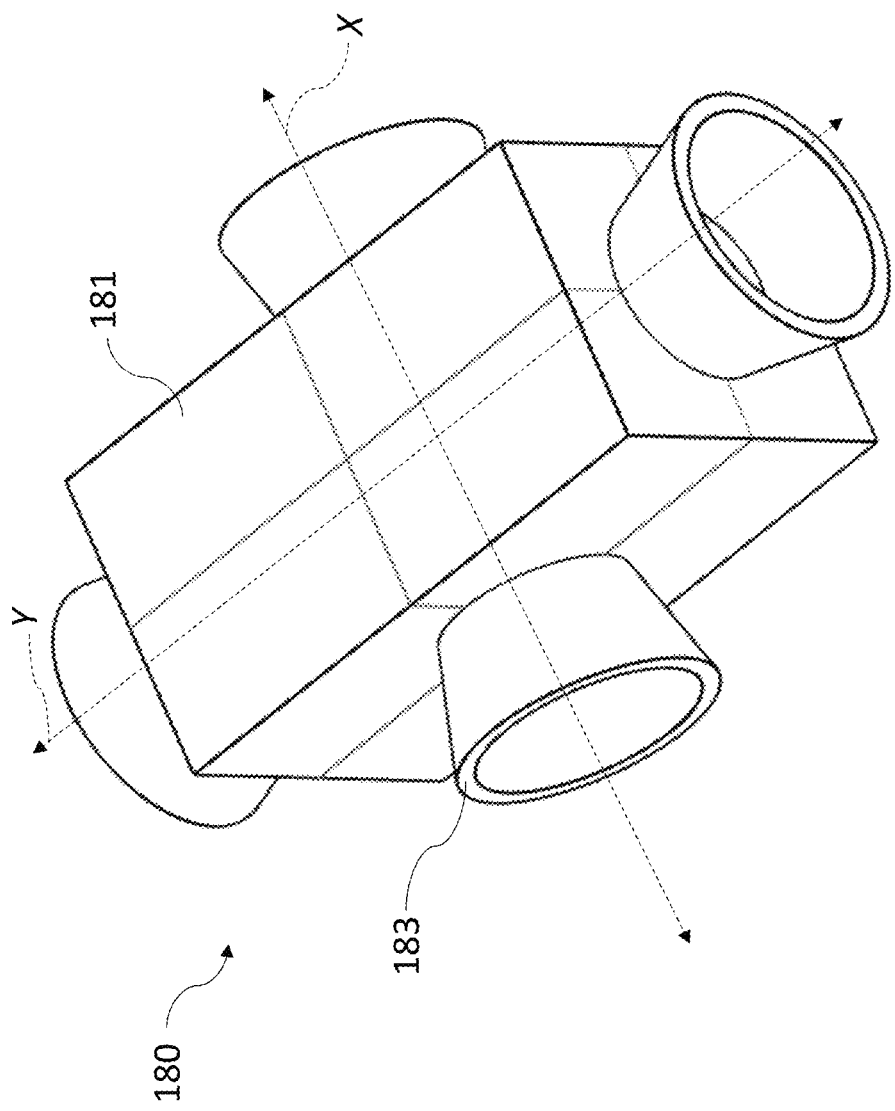
FIG. 7 illustrates a top perspective view of an embodiment of a four-way orbital thruster of the debris collecting apparatus.
Figure 8:
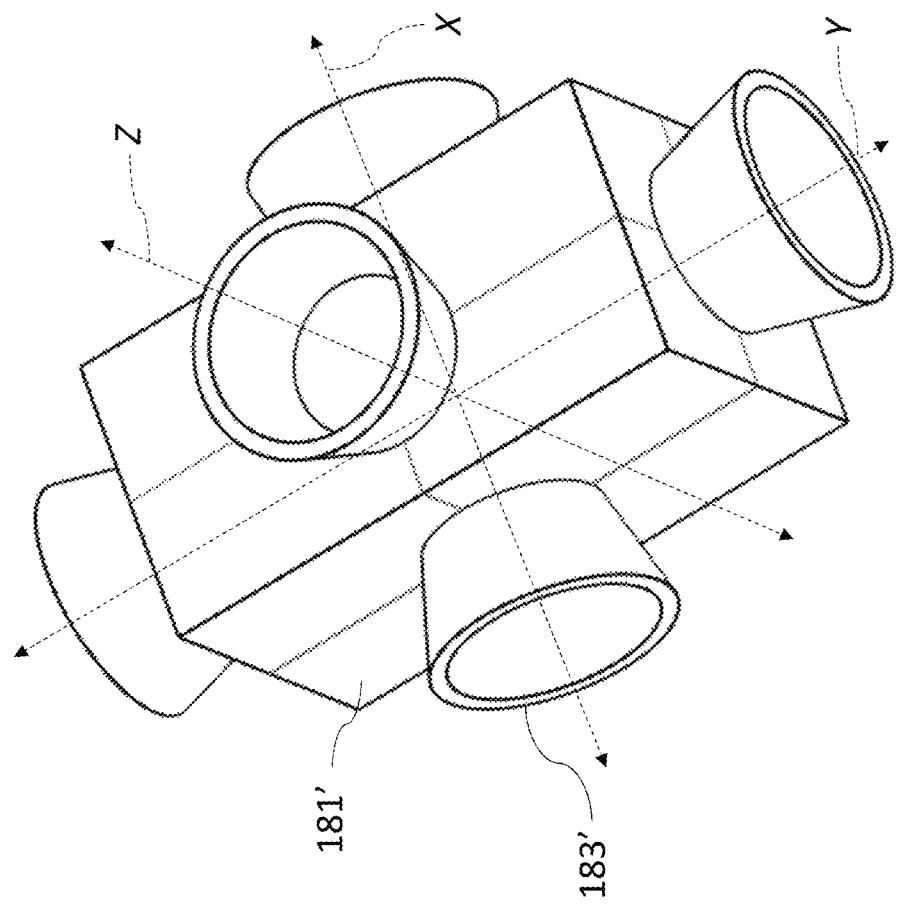
FIG. 8 illustrates a top perspective view of an embodiment of a live-way orbital thruster of the debris collecting apparatus.
Figure 9:
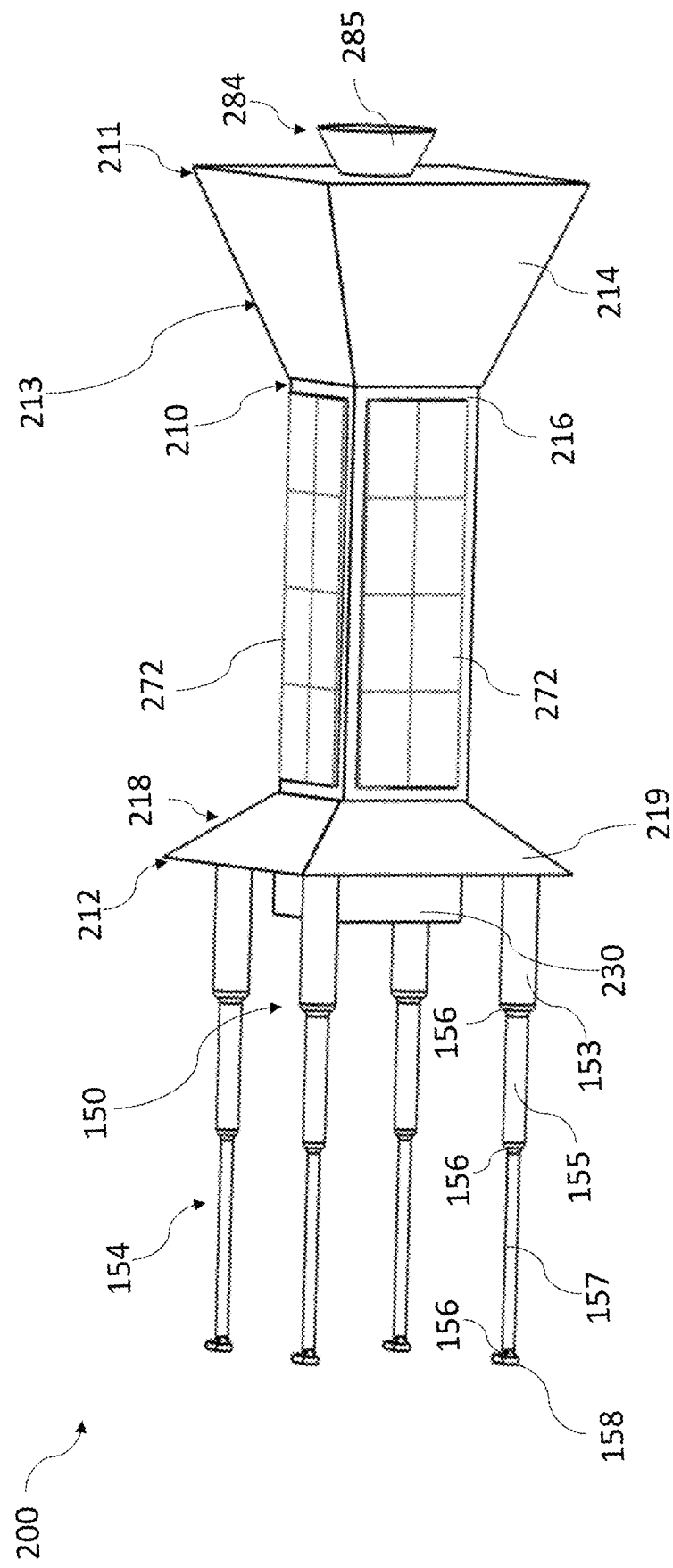
FIG. 9 illustrates a side perspective view of another embodiment of the debris collecting apparatus.
Figure 10:
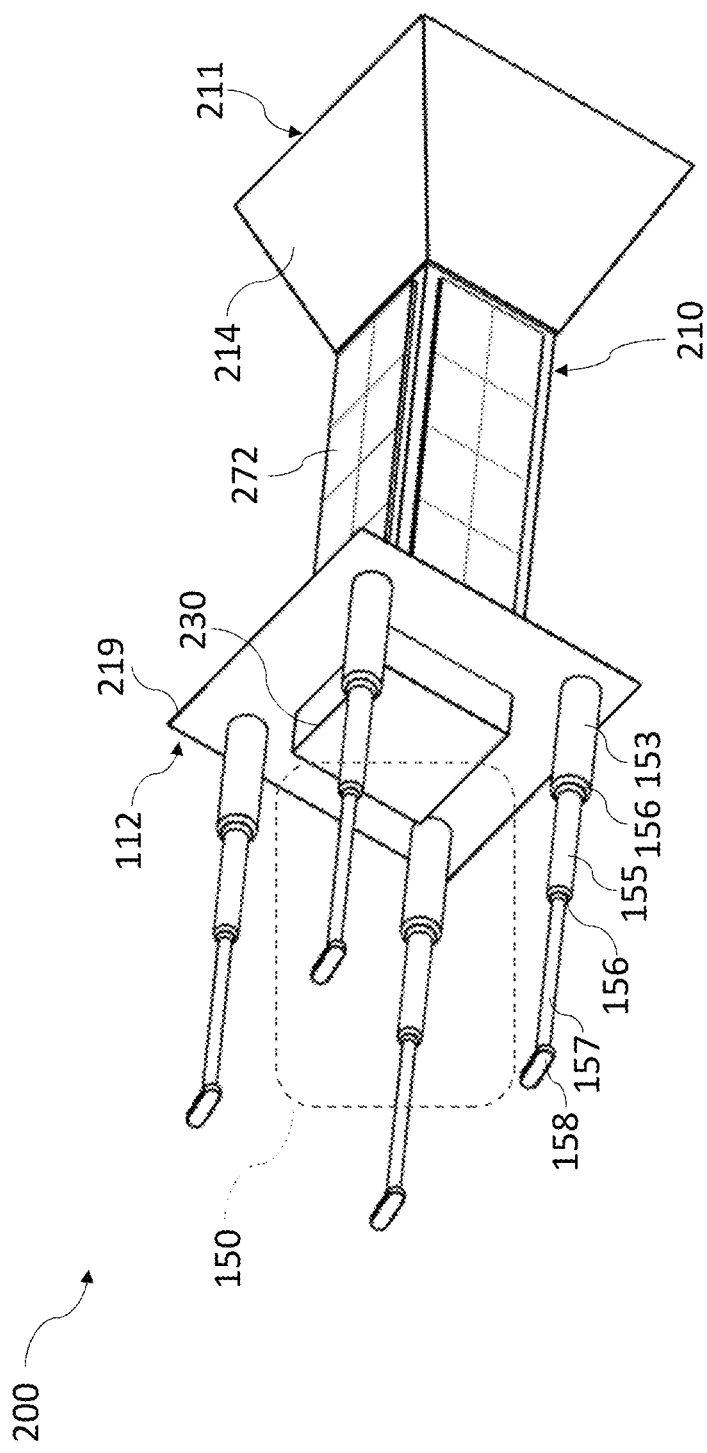
FIG. 10 illustrates a front perspective view of the embodiment of the debris collecting apparatus of FIG. 9.
Figure 11:
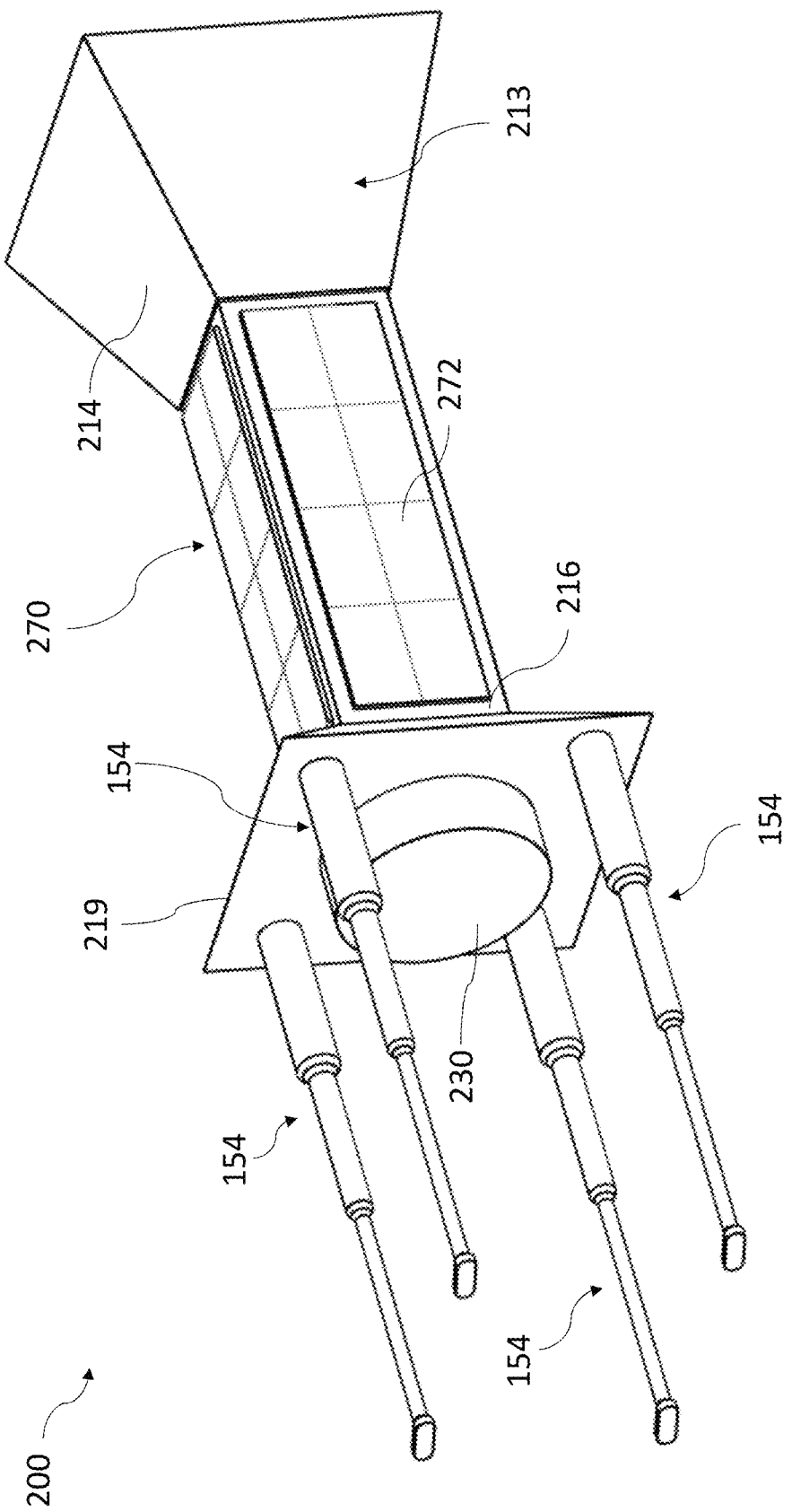
FIG. 11 illustrates a front, side perspective view of the embodiment of the debris collecting apparatus of FIG. 9

Referring to FIG. 7, the orbital thruster 180 may be a four (4) way thruster comprising a body 181 with four exhaust cones 183 extending from the body 181 in four (4) directions. As shown, two (2) exhaust cones 183 extend along a first axis X and the remaining two (2) exhaust cones extend along a second axis Y. In other embodiments, three (3) of the exhaust cones 183 may extend along different axes. The orbital thruster 180' illustrated in FIG. 8 is a five (5) way orbital thruster comprising a body 181' with live (5) exhaust cones 183' extending from the body 181'. As shown, two (2) exhaust cones 183', extend along a first axis X, two (2) exhaust cones 183' extend along a second axis Y. and the remaining exhaust cone 183' extends along a third axis Z. It should be clear to a person skilled in the art that the configuration and number of thrusters used to control the positon and speed of the debris collecting apparatus 100 may vary depending on the specifications of the debris collecting apparatus 100 and the debris 50 identified for collection.

FIGS. 9-15 generally disclose alternate embodiments of the debris collecting apparatus 200, 300. These alternate embodiments are meant to show the versatility and ability of various aspects of the debris collecting apparatus 200, 300 to be customized according to the particular debris collecting mission and are not exhaustive, nor are they limiting. In each embodiment, the collecting extensions 154 from the debris collecting apparatus 100 previously discussed are depicted, however alternate embodiments (and numbers) of the collecting extensions may be used.

Referring to FIGS. 9-12, the debris collecting apparatus 200 generally comprises a body 210 having a front end 211 and a rear end 212. As shown, the body 110 comprises a plurality of polygonal-shaped portions coupled together to define an outer surface 213 and an inner cavity (not shown). The inner cavity (not shown) may be configured as discussed above to house or define one or more fuel compartments and/or fuel cells and/or batteries and one or more electrical components configured to actuate components of the debris collecting apparatus 200, enable control of one or more components, enable electrical communication between components of the debris collecting apparatus 200 and/or enable bidirectional communication with a remote server, or control device. It can be appreciated by one skilled in the art that the inner cavity (not shown) may be configured to house a variety of components depending on the nature of the environment the apparatus 200 is in and the nature of the debris to be collected.

Still referring to FIGS. 9-12, the rear portion 214 of the body 210 may be configured to at least partially surround and house a main thruster 284 comprising an exhaust cone 285, or other propulsion device. A mid portion 216 is coupled to the rear portion 214 and a front portion 218 is coupled to the mid portion 216 such that the rear portion 214 is separated from the front portion 218 by the mid portion 216. As shown, the rear portion 214, mid portion 216, and the front portion 218 may comprise varying shaped and sized sides. As shown, the mid portion 216 comprises a plurality of rectangular-shaped sides and the rear portion 214 and the front portion 218 comprise a plurality of trapezoidal sides. The front portion 218 further defines a shield or skirt 219 configured to at least partially surround and protect the electromagnet 230.

Figure 12:
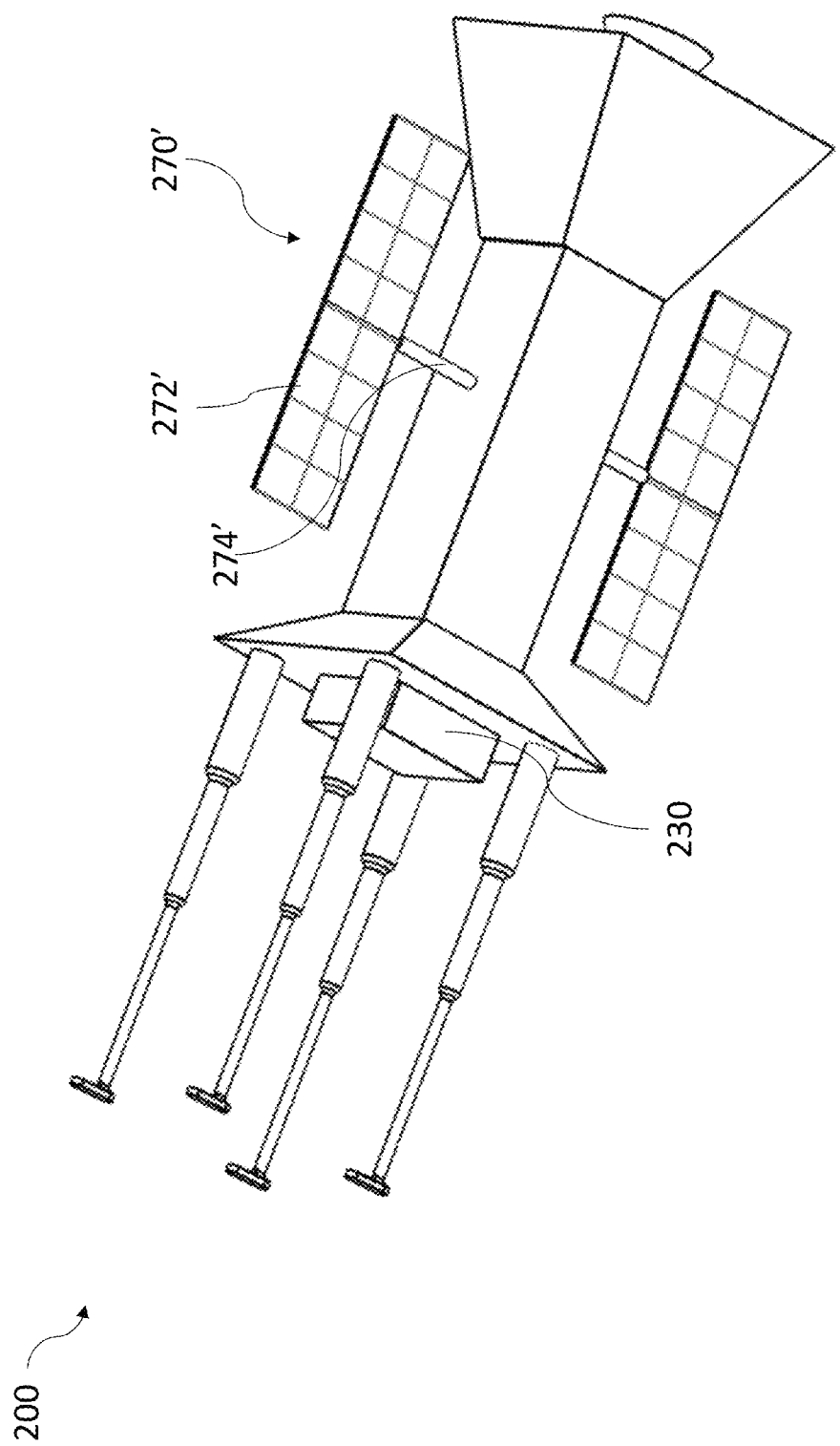
FIG. 12 illustrates a side perspective view of the embodiment of the debris collecting apparatus of FIG. 9 with an alternate embodiment of a solar assembly.

The electromagnet 230 is generally the same as the electromagnet 130 previously described. A solar arrangement 270 may be provided to generate power to be fed to the power supply. The solar arrangement 270 comprises a plurality of solar panels 272 coupled to the body 210. As shown specifically in FIGS. 9-11, the plurality of solar panels 272 are coupled to the mid portion 216 and extend along the same plane or a parallel plane to the plane of the sides of the mid portion 216. The solar panels 272 may be configured to pivot relative to the body 210. Referring to FIG. 12, the solar array 270' comprises a plurality of solar panels 272' supported by one or more solar panel supports 274' configured to hold the plurality of solar panels 272' away from the body 210 of the debris collecting apparatus 200. The plurality of solar panels 272' may be configured to pivot according to any of the previously described embodiments. The debris collecting apparatus 200 may further include one or more additional thrusters such as those described in any of the previously disclosed embodiments.

Figure 13:
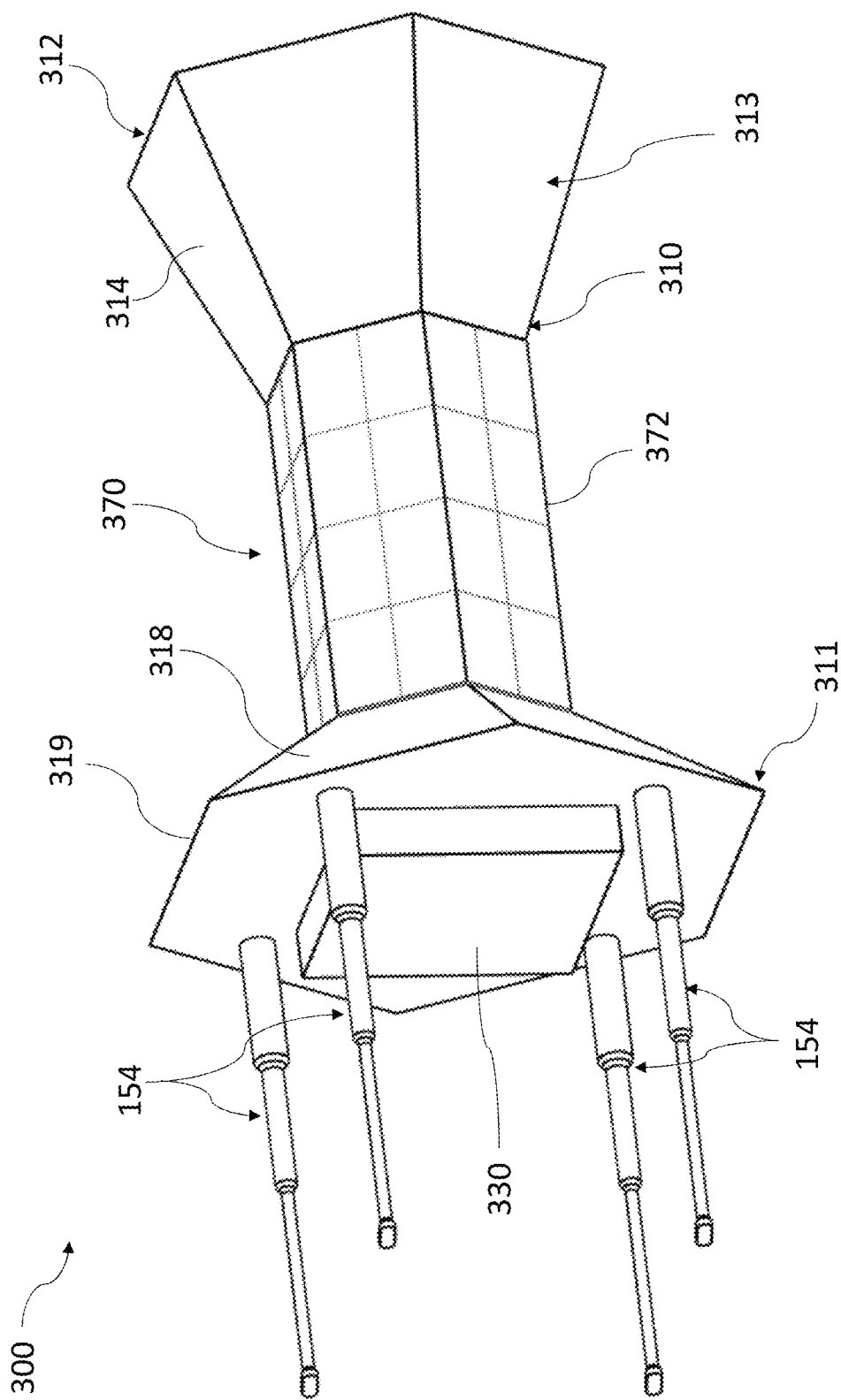
FIG. 13 illustrates a front, side perspective view of another embodiment of the debris collecting apparatus.
Figure 14:
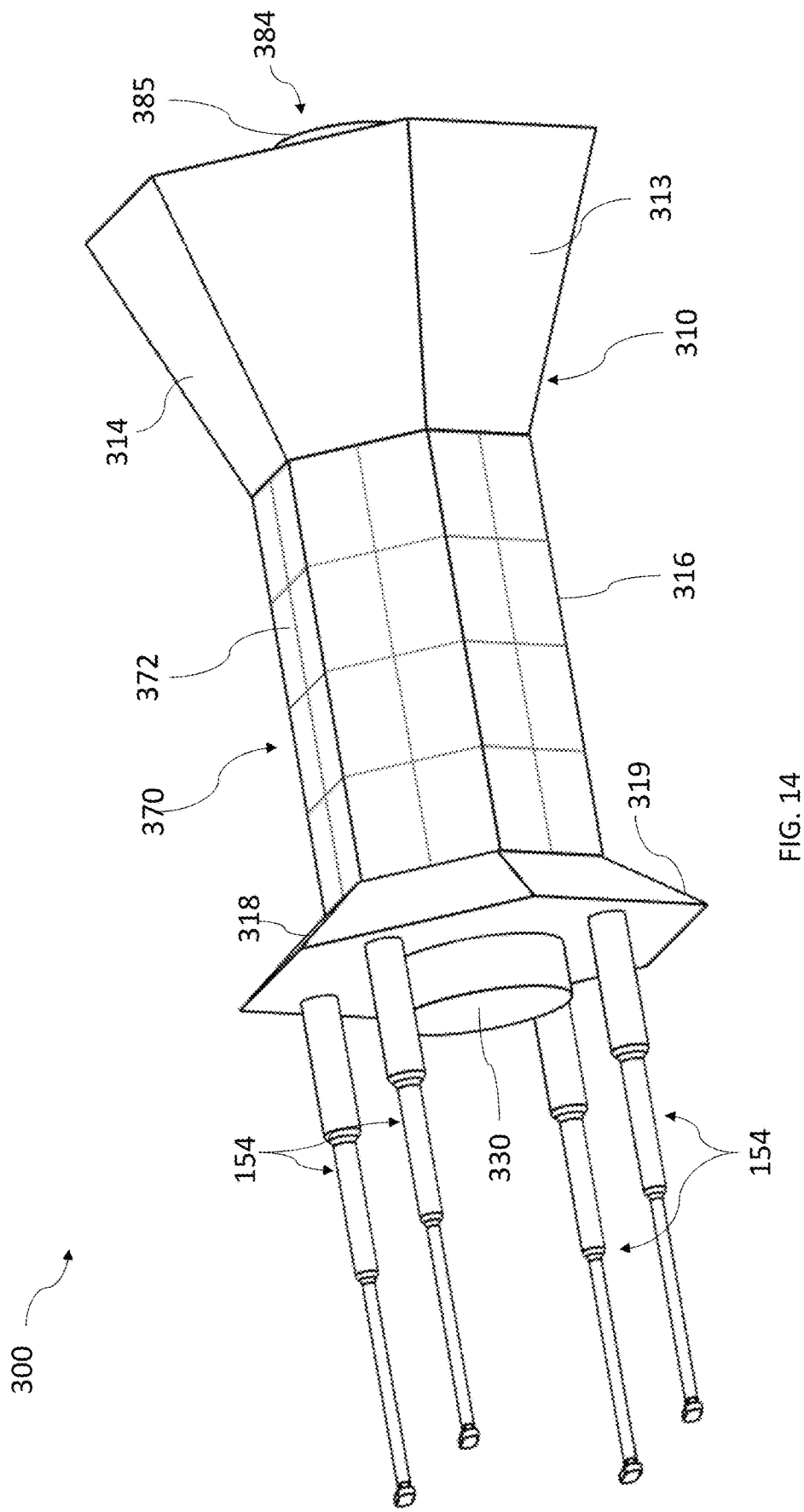
FIG. 14 illustrates a side perspective view of the embodiment of the debris collecting apparatus of FIG. 13.
Figure 15:
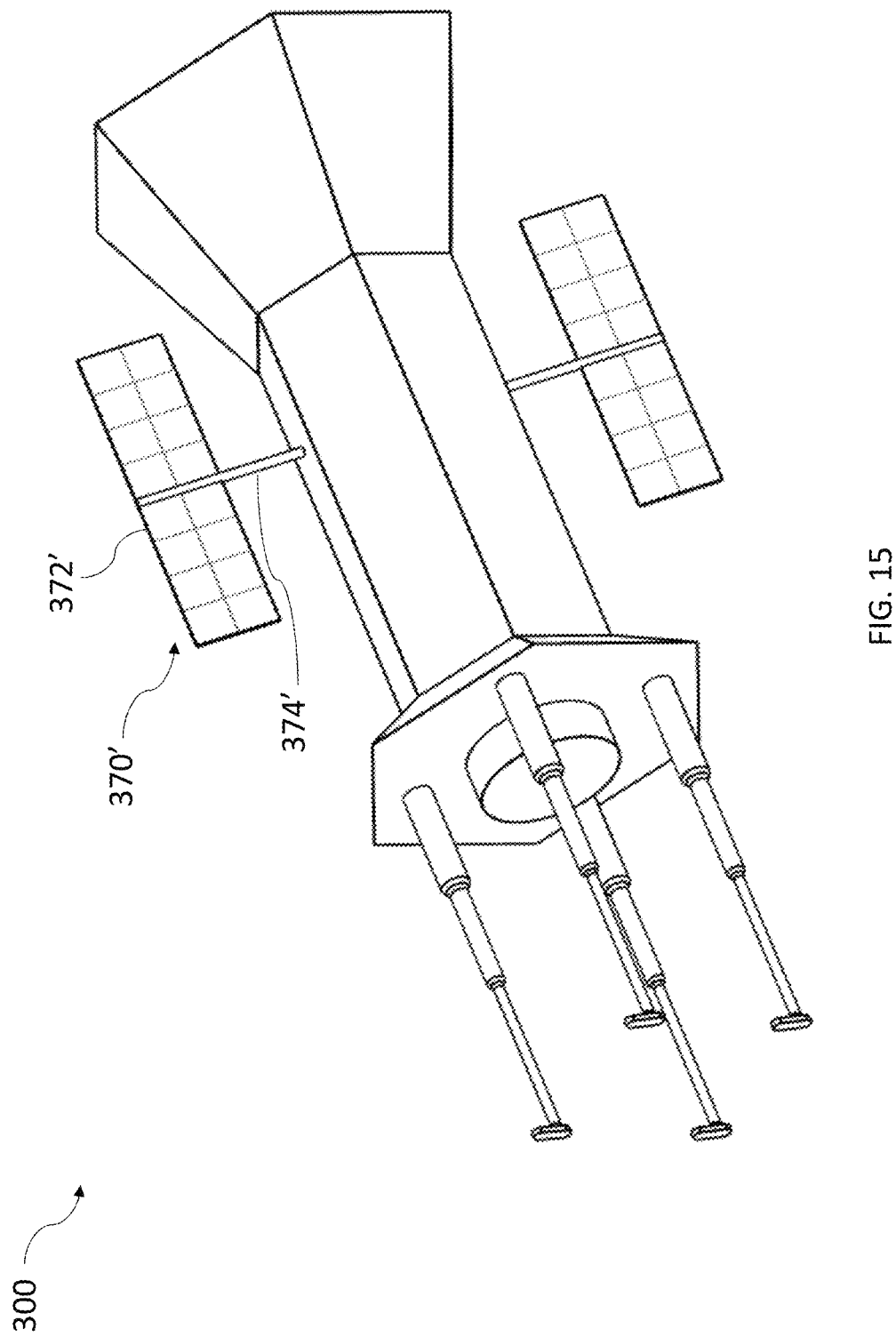
FIG. 15 illustrates a front, side perspective view of the embodiment of the debris collecting apparatus of FIG. 13 with an alternate embodiment of a solar assembly.

Turning now to the embodiment of the debris collecting apparatus 300 shown in FIGS. 13-15. This embodiment of the debris collecting apparatus 300 generally comprises a body 310 having a front end 311 and a rear end 312. As shown, the body 310 comprises a plurality of polygonal-shaped portions coupled together to define an outer surface 313 and one or more inner cavities (not shown). The one or more inner cavities (not shown) may be configured as discussed above to house or define one or more fuel compartments and/or fuel cells and/or batteries and one or more electrical components configured to actuate components of the debris collecting apparatus 300, enable control of one or more components, enable electrical communication between components of the debris collecting apparatus 300 and/or enable bidirectional communication with a remote server, or control device. It can be appreciated by one skilled in the art that the inner cavity (not shown) may be configured to house a variety of components depending on the nature of the environment the apparatus 300 is in and the nature of the debris to be collected.

Still referring to FIGS. 13-15, the rear portion 314 of the body 310 may be configured to at least partially surround and house a main thruster 384 (FIG. 3) comprising an exhaust cone 385 (FIG. 9), or other propulsion device. A mid portion 316 is coupled to the rear portion 314 and a front portion 318 is coupled to the mid portion 316 such that the rear portion 314 is separated from the front portion 318 by the mid portion 316. As shown, the rear portion 314, mid portion 316, and the front portion 318 may comprise varying shaped and sized sides. The mid portion 316 may comprise a plurality of rectangular-shaped sides and the rear portion 314 and the front portion 318 comprise a plurality of trapezoidal sides. The front portion 318 further defines a shield or skirt 319 configured to at least partially surround and protect the electromagnet 330.

The electromagnet 330 is generally the same as the electromagnet 130 previously described. A solar arrangement 370 may be provided to generate power to be fed to the power supply. The solar arrangement 370 comprises a plurality of solar panels 372 coupled to the body 310. As shown specifically in FIGS. 13-14, the plurality of solar panels 372 are coupled to the mid portion 316 and extend along the same plane or a parallel plane to the plane of the sides of the mid portion 316. The solar panels 372 may be configured to pivot relative to the body 310. Referring to FIG. 15, the solar array 370' comprises a plurality of solar panels 372' supported by one or more solar panel supports 374' configured to hold the plurality of solar panels 372' away from the body 310 of the debris collecting apparatus 300. The plurality of solar panels 372' may be configured to pivot according to any of the previously described embodiments. The debris collecting apparatus 300 may further include one or more additional thrusters such as those described in any of the previously disclosed embodiments.

Figure 16:
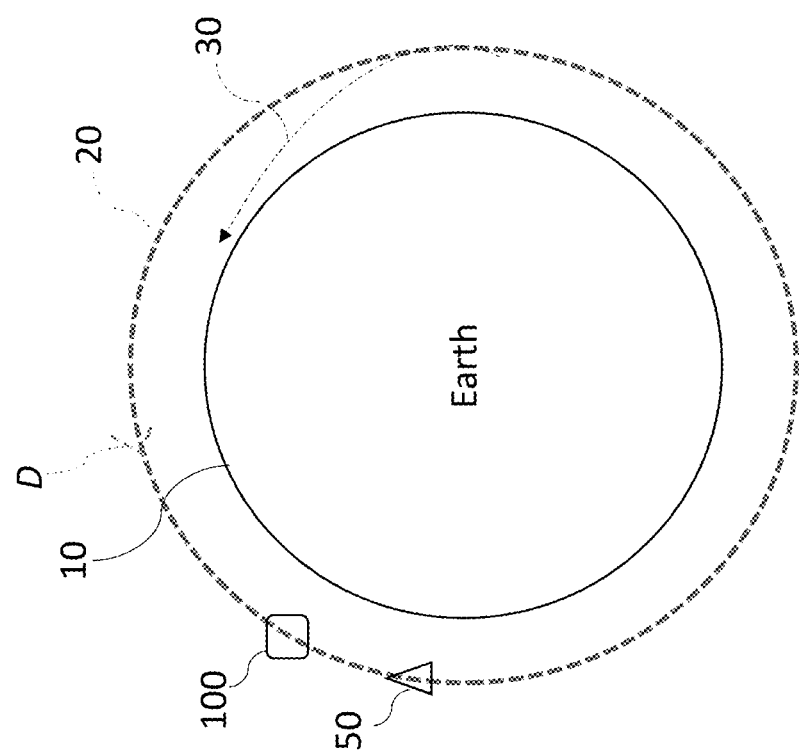
FIG. 16 illustrates a schematic view of the Earth showing an example of a low Earth orbital path and an example of a decaying orbital path.
Figure 17B:
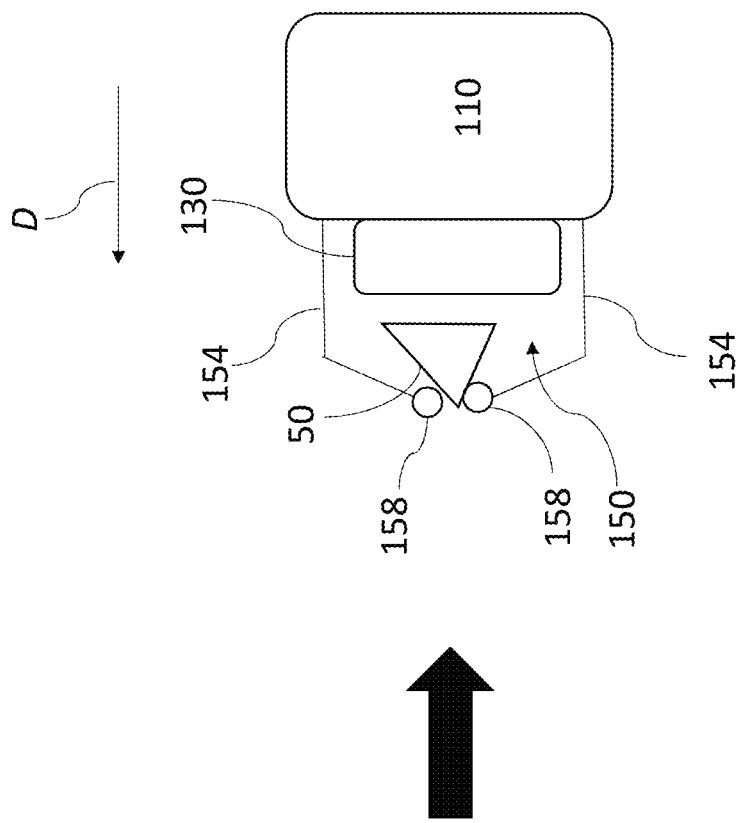
FIG. 17B illustrates a schematic view of the debris collecting apparatus after collecting or retaining the piece of orbital debris.
Figure 17A:
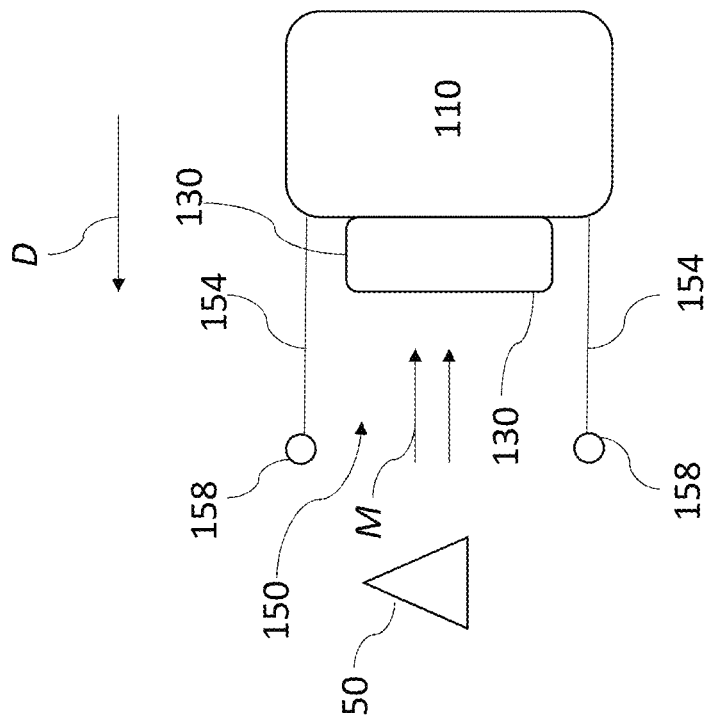
FIG. 17A illustrates a schematic view of the debris collecting apparatus attracting a piece of orbital debris.
Figure 18:
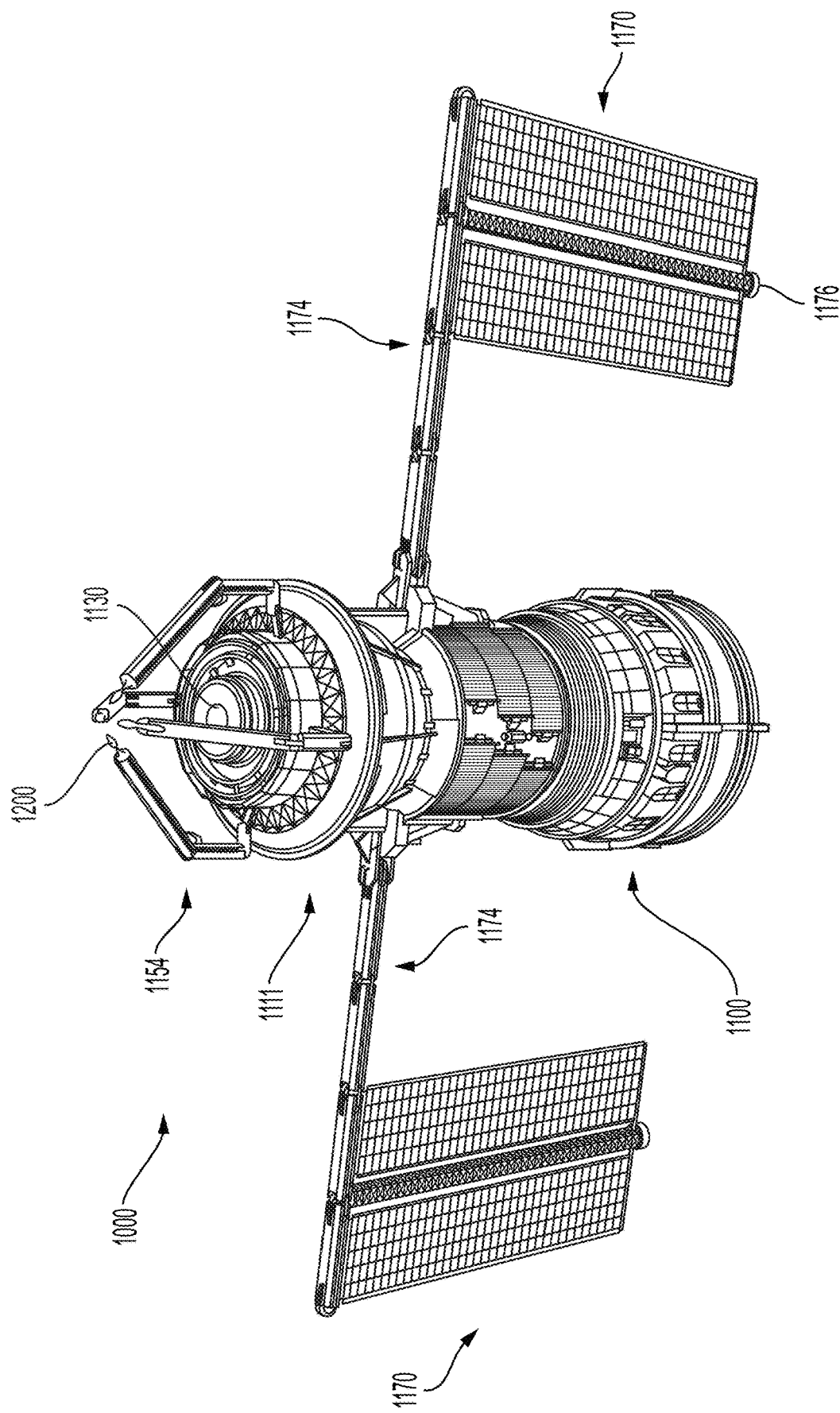
FIG. 18 illustrates a front perspective view of another embodiment of the debris collecting apparatus.

Referring to FIGS. 16-17b, the general method of debris collection using the debris collecting apparatus 100 will now be described. FIG. 16 is a schematic depiction of the Earth 10 showing the LEO 20 with the debris collecting apparatus 100 and the debris 50 orbiting in an orbital direction D. Referring to FIG. 17A, when the debris collecting apparatus 100 approaches a piece of debris 50, the electromagnet 130 is activated, which generates a magnetic force M that attracts the piece of debris 50 towards the collection zone 150 and simultaneous slows or stops the rotation of the debris 50. In this phase, the collecting extensions 154 are in an "open" position to allow access to the collection zone 150. Control of the electromagnet 130 may be done automatically or may be initiated by the remote server or control device. Once the debris 50 reaches the collection zone 150 as shown in FIG. 17B, the electromagnet 130 is deactivated or reduced in intensity and the collecting extensions 154 are articulated to a "closed" position to secure/retain the debris 50 in the collection zone 150. The contact elements 158 act to contact and retain the debris 50. Control of the collecting extensions 154 may be achieved automatically or may be initiated by the remote server or control device. Different embodiments of the collecting extensions 154 may secure/retain debris 50 in different manners. The skirt 119 may act to shield the mid portion 116 and rear portion 114 of the body 110 from debris that escapes the collecting extensions 154 and/or cannot be retained by the collecting extensions 154.

Once the debris 50 is secured, the thrusters 180, 182, 184 alter the speed, orientation and/or trajectory of the debris collecting apparatus 100 such that is enters a decaying orbit 30 (FIG. 16) where it slowly descends closer to the Earth 10. When the debris collecting apparatus 100 reaches a predetermined altitude above Earth 10, the collecting extensions 154 may be moved back into an "open" positon as shown in FIG. 17A to release the debris 50 to continue along the decaying orbit 30. Once the debris 50 is released, the thrusters 180, 182, 184 are activated to take the debris collecting apparatus 100 out of the decaying orbit and return it to a LEO 20 where it can collect additional debris 50. The decaying orbit 30 is calculated such that the released debris 50 will enter the Earth's atmosphere and either completely incinerate upon reentry or such that any surviving pieces of debris 50 land in an ocean.

The combustible fuel onboard the debris collecting apparatus 100 may allow 1-5 such debris collections. Prior to fuel exhaustion, the debris collecting apparatus 100 may be put in a decaying orbit and incinerate upon reentry and/or crash into an ocean. As the debris 50 in LEO 20 is closely monitored, the debris collecting apparatus 100 may be returned to LEO at a specific location with a mission to collect and dispose of specific pieces of debris 50. In this manner, the number of pieces of debris 50 collected may be maximized given the fuel constraints. As such, the final piece of debris 50 (or a challenging piece of debris) may be retained by the debris collecting apparatus 100 during the course of the decaying orbit 30 and be scrapped along with the piece of debris 50. One or more of the actions taken by the debris collecting apparatus 100 may be performed automatically without external intervention, however in other embodiments, control of the one or more components of the debris collecting apparatus 100 may be achieved via a remote server or control device.

In another embodiment, a debris collecting apparatus 1000 may be configured to dispense a dense foam to at least partially surround a piece of debris 50. Referring to FIGS. 18-24, the debris collecting apparatus 1000 may include one or more similar elements to other embodiments of the debris collecting apparatus previously discussed. The debris collecting apparatus 1000 generally comprises a body 1110 having a first end or front end 1111 and a second end or rear end 1112. As shown, the body 1100 is generally cylindrical or comprised of a plurality of polygonal-shaped portions coupled together to define an outer surface 1113 and an inner cavity (not shown). The inner cavity (not shown) may be configured as discussed above to house or define one or more fuel compartments and/or fuel cells and/or batteries and/or storage tanks and one or more electrical components configured to actuate components of the debris collecting apparatus 1000, enable control of one or more components, enable electrical communication between components of the debris collecting apparatus 1000 and/or enable bidirectional communication with a remote server, or control device. It can be appreciated by one skilled in the art that the inner cavity (not shown) may be configured to house a variety of components depending on the nature of the environment the apparatus 1000 is in and the nature of the debris 50 to be collected.

Figure 19:
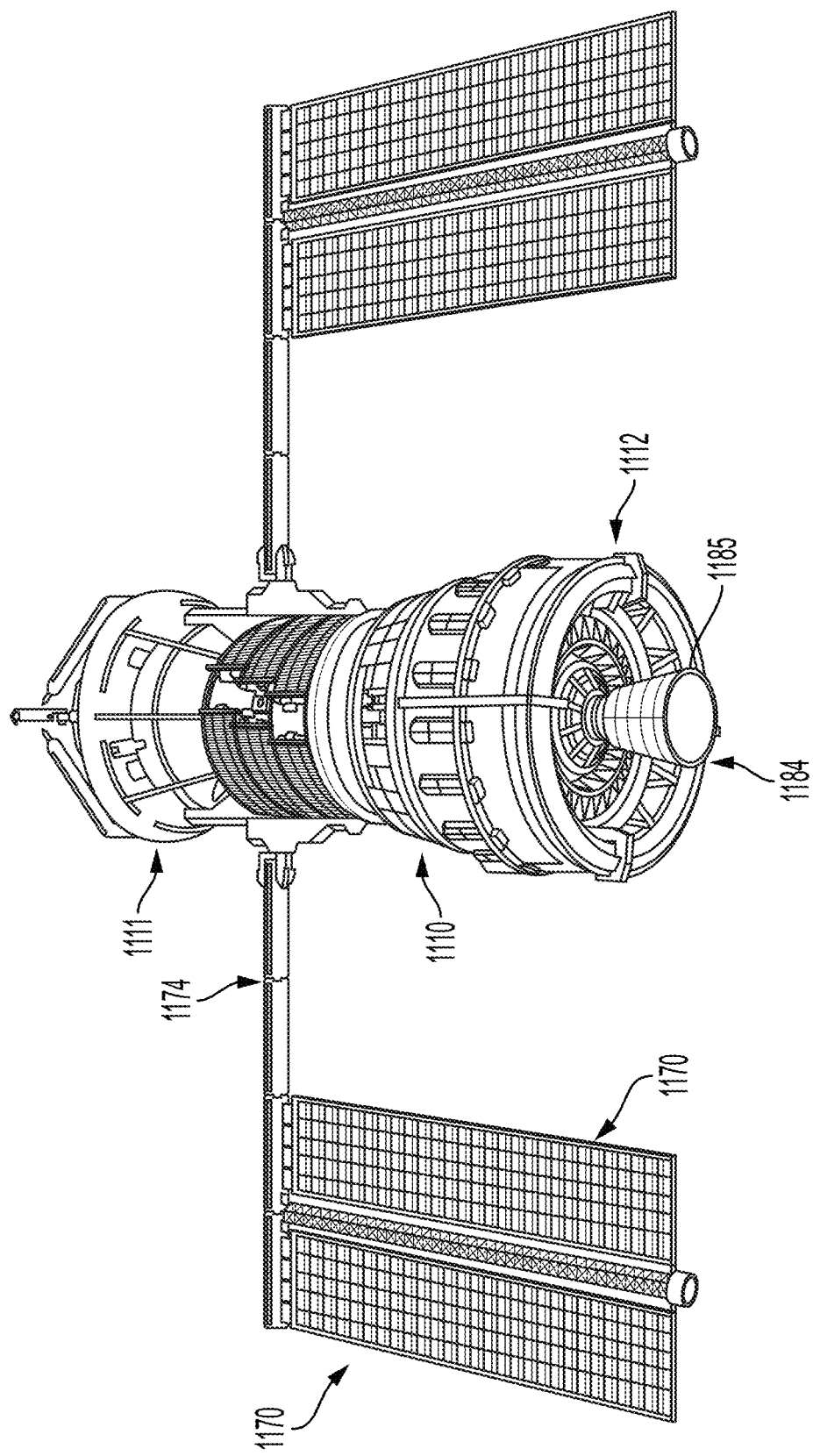
FIG. 19 illustrates a rear perspective view of the embodiment of the debris collecting apparatus of FIG. 18.
Figure 20:
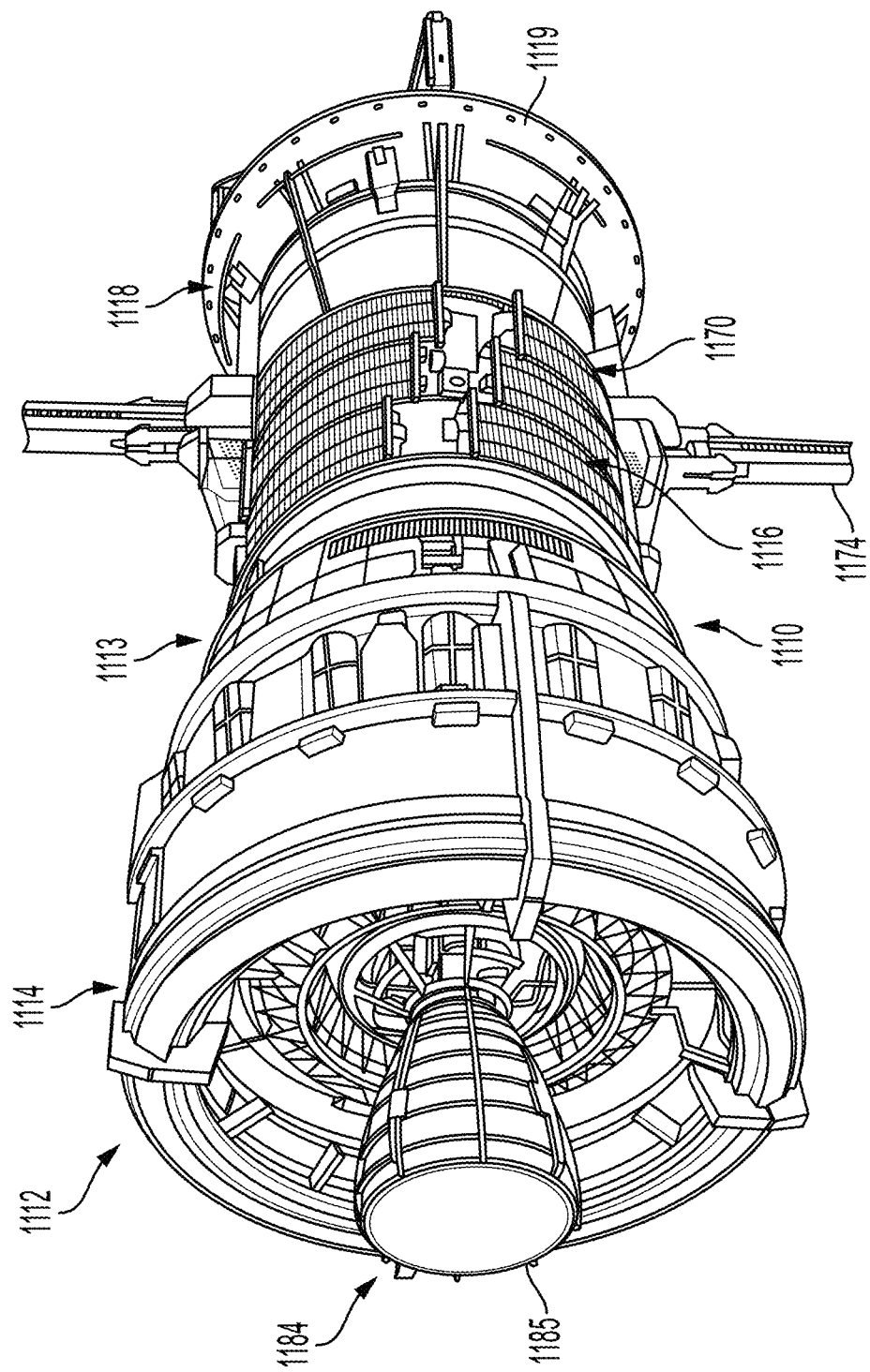
FIG. 20 illustrates a partial close up view of the embodiment of the debris collecting apparatus of FIG. 19.
Figure 21:
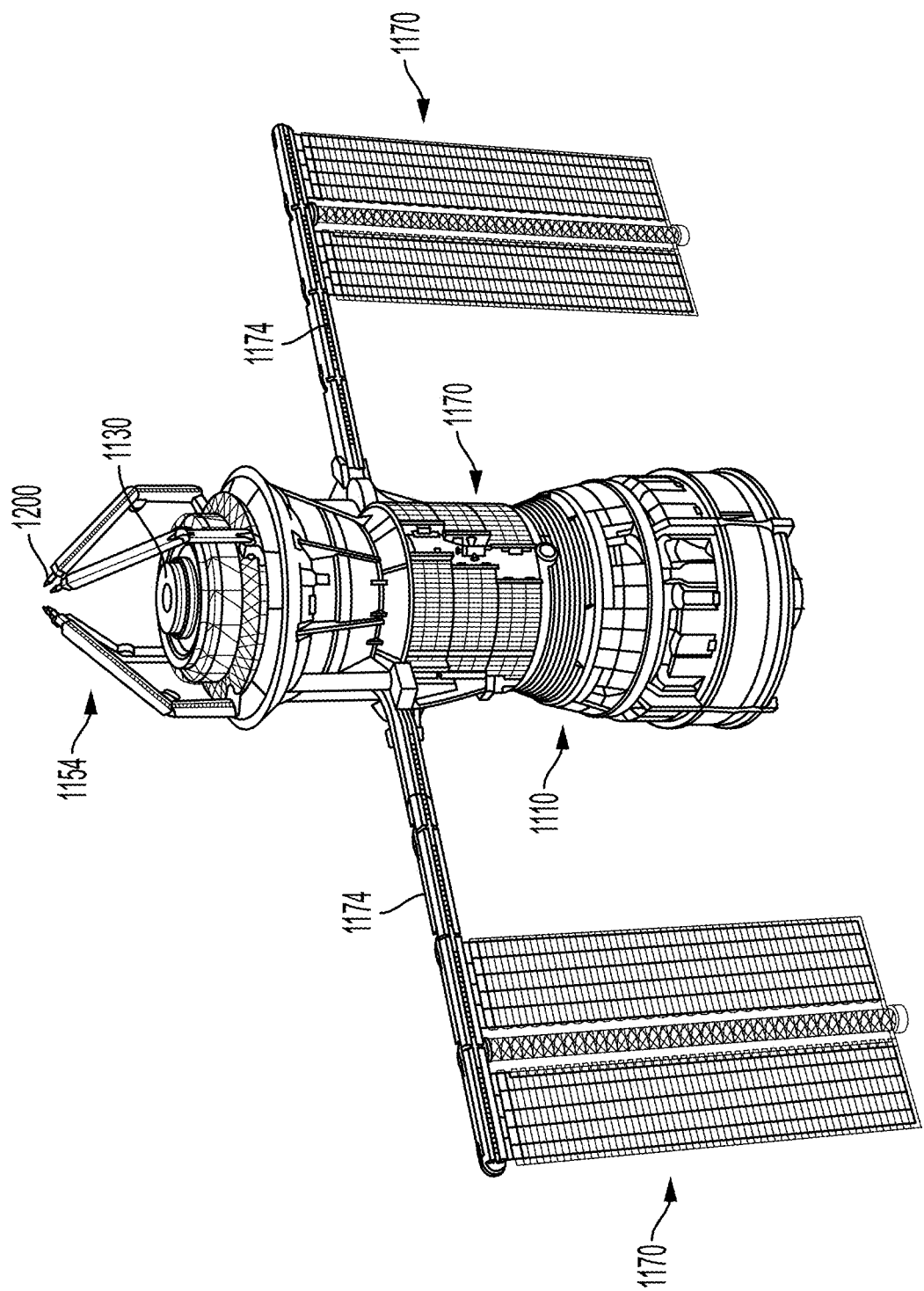
FIG. 21 illustrates a side perspective view of the embodiment of the debris collecting apparatus of FIG. 18.
Figure 22:
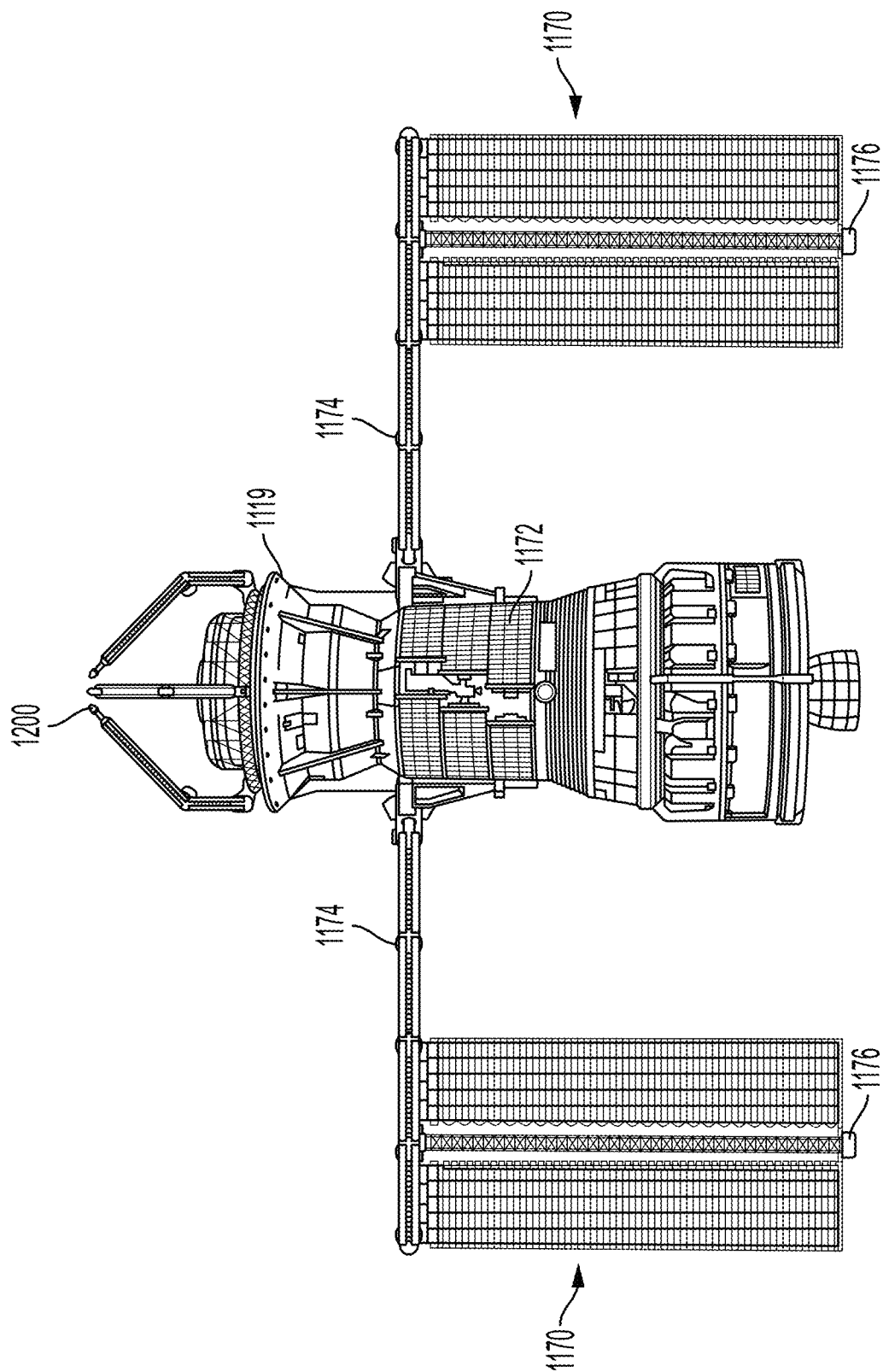
FIG. 22 illustrates a side perspective view of the embodiment of the debris collecting apparatus of FIG. 18.
Figure 23:
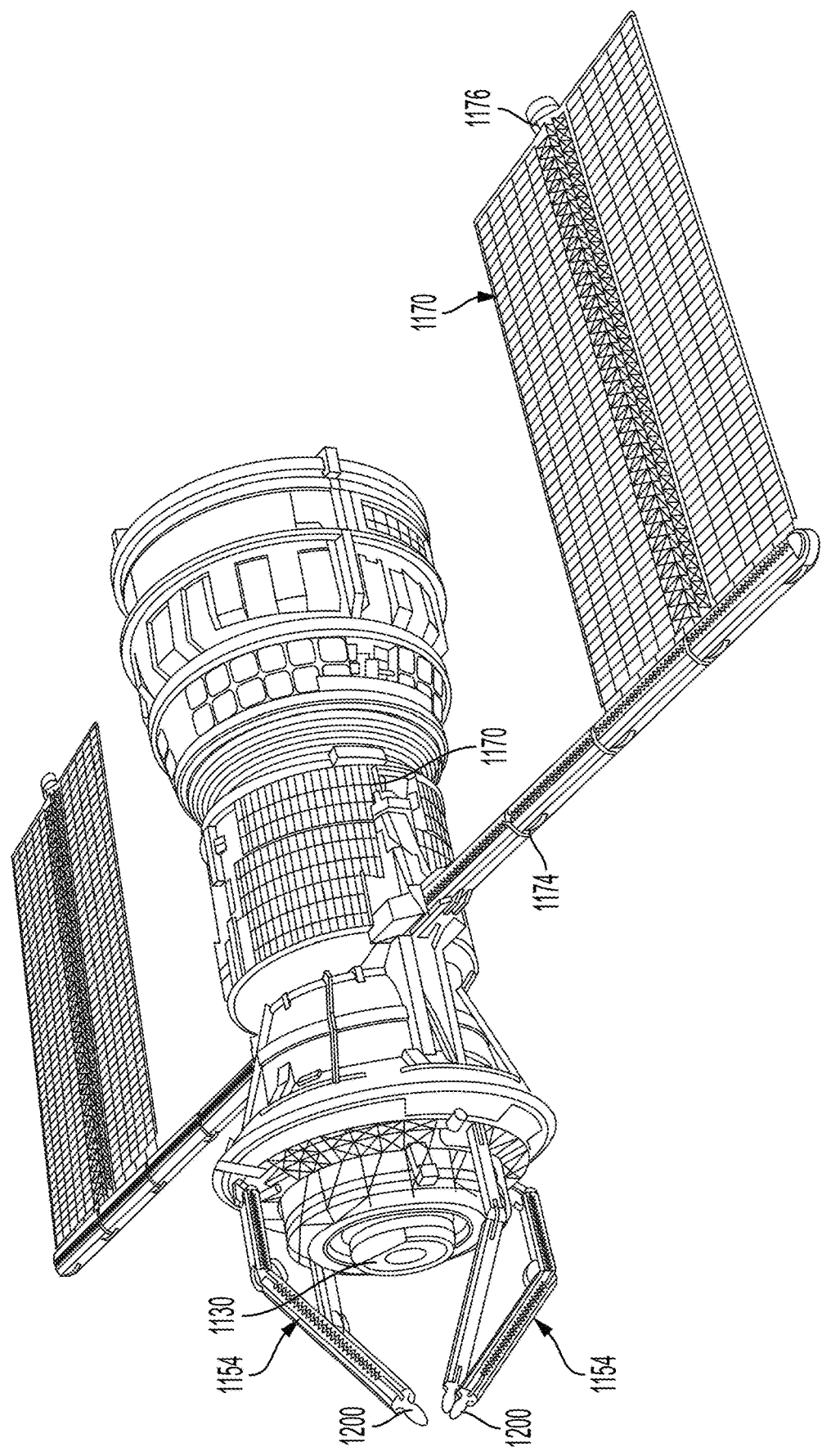
FIG. 23 illustrates a front perspective view of the embodiment of the debris collecting apparatus of FIG. 18.
Figure 24:
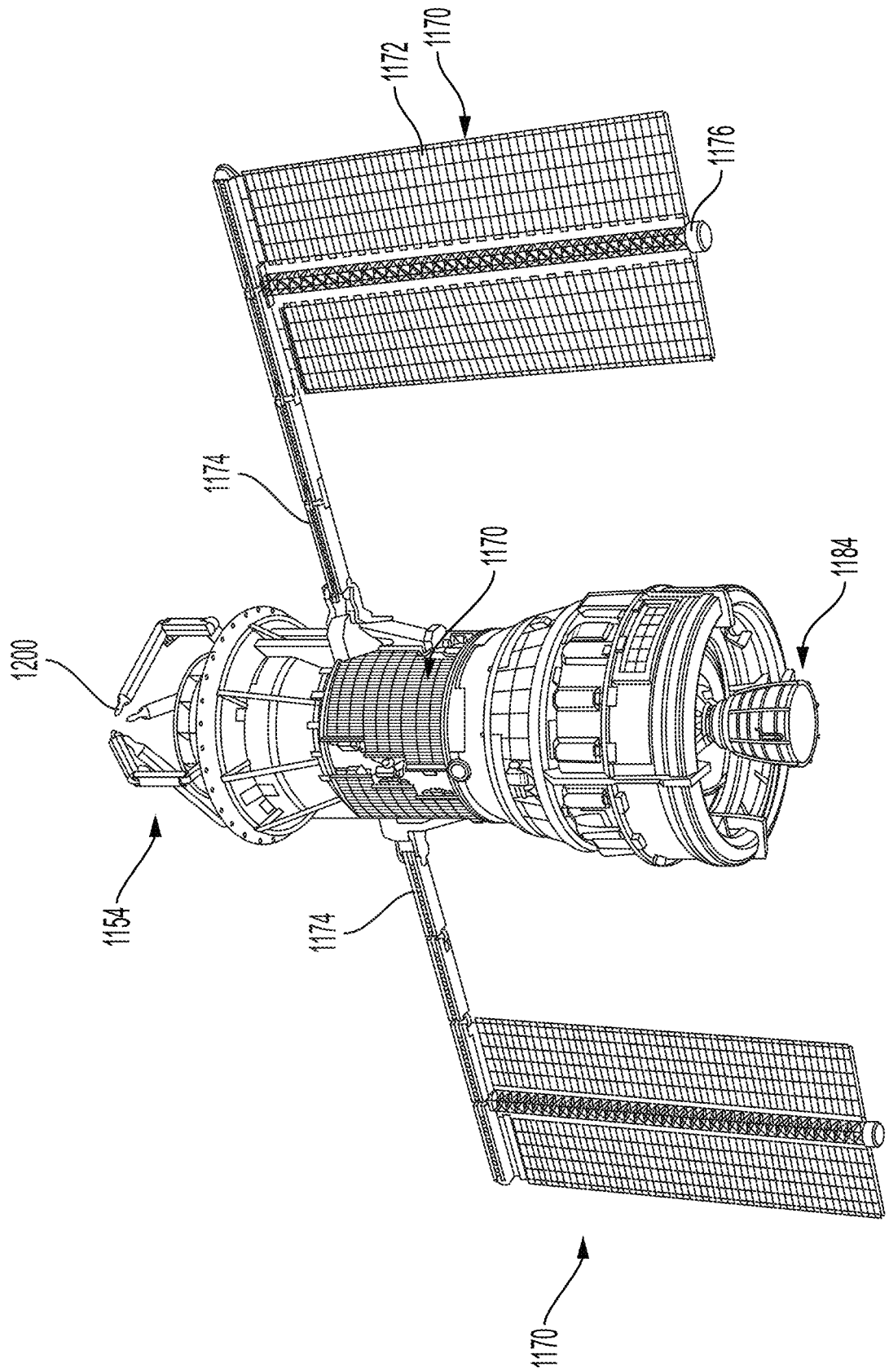
FIG. 24 illustrates a rear perspective view of the embodiment of the debris collecting apparatus of FIG. 18.

As shown in FIG. 19, the rear portion 1114 of the body 1110 may be configured to at least partially surround and house a main thruster 1184 comprising an exhaust cone 1185, or other propulsion device. A mid portion 1116 is coupled to the rear portion 1114 and a front portion 1118 is coupled to the mid portion 1116 such that the rear portion 1114 is separated from the front portion 1118 by the mid portion 1116. As shown, the rear portion 1114, mid portion 1116, and the front portion 1118 may comprise varying shaped and sized sides. As shown, the mid portion 1116 comprises a plurality of rectangular-shaped sides and the rear portion 1114 and the front portion 1118 comprise a plurality of trapezoidal sides. The front portion 1118 further defines a shield or skirt 1119 configured to at least partially surround and protect the electromagnet 1130.

The electromagnet 1130 is generally the same as the electromagnet 130 previously described. One or more solar arrangements or arrays 1170 may be provided to generate power to be fed to a power supply which may be located within or otherwise surrounded by the body 1100. Each solar arrangement 1170 comprises a plurality of solar panels 1172 coupled to the body 1110. As shown, one or more of the solar arrangements 1170 may be coupled to the body 1110 by one or more solar arrangement supports 1175 that hold the solar arrangement 1170 away from the body 1110. The one or more solar arrangement supports 1175 may be configured to pivot relative to the body 1110 and/or adjust in length such that the solar arrangement 1170 may be moved closer to or farther from the body 1110. The one or more solar arrangement supports 1175 may further couple to an additional support 1176 that may aid in supporting the individual solar panels 1172 that comprise the solar arrangement 1170. The additional support 1176 may be configured to pivot or rotate relative to the one or more extensions 1176, which further increases the adjustability of the solar arrangements 1170. The solar arrangements 1170 and solar panels 1172 may be moved or adjusted using one or more actuators that may be supplied with power from an onboard fuel source and controlled remotely from the surface of Earth.

One or more solar arrangements 1170 may also be positioned on the body 1110. As shown, one or more solar arrangements 1170 are position on the mid portion 1116 and extend along the same plane or a parallel plane to the plane of the sides of the mid portion 1116. The entire solar arrangement 1170 or the individual solar panels 1172 or both may be configured to pivot relative to the body 1110. These solar arrangements 1170 are positioned on the body 1110 and the plurality of solar panels 1172 comprising them may be configured to pivot relative to each other and/or relative to the body 1110 according to any of the previously described embodiments. The debris collecting apparatus 1000 may further include one or more additional thrusters such as those described in any of the previously disclosed embodiments.

In the embodiments of the debris collecting apparatus 1000 shown, a plurality of collecting extensions 1154 are positioned around the electromagnet 1130. The collecting extensions 1154 may have similar features to those previously described. The distal end 1152 of the collecting extensions 1154 may each further comprise a dispenser 1200. Each dispenser 1200 is fluidly coupled to a reservoir (not shown) that may be positioned within the body 1110 or may be positioned outside the body 1110. The reservoir is configured to hold a high density foam to be dispensed by the dispensers 1200. In an embodiment, multiple reservoirs may hold individual constituent components of the foam that are mixed at or near the dispensers 1200. The dispensers 1200 may be positioned toward the distal end 1152 of the collecting extensions 1154 along with one or more other components previously described such as securing or contacting elements 158 (FIG. 5). The dispensers 1200 may further be able to pivot or rotate relative to their corresponding collecting extension 1154.

In some situations it may not be advantageous, practical, or even possible to capture a piece of debris 50 due to the small size of the debris 50, fuel considerations, or other factors. In such instances, the debris collecting apparatus 1000 may dispense a high density foam from the one or more dispensers 1200 positioned on the collecting extensions. The foam may be dispensed onto the debris 50 to increase its size so it can be collected as previously described. The foam also affects the orbit of the debris 50 and the proper amount of foam dispensed onto the debris 50 can initiate a decaying orbit such that the debris 50 does not need to be collected by the debris collecting apparatus 1000.

In other instances, the one or more dispensers 1200 may dispense a non-porous foam as a means to cushion the debris collecting apparatus 1000 against a collision with a piece of orbital debris 50. In another embodiment, the one or more dispensers 1200 may be used to at least partially surround a piece of orbital debris retained in the collecting zone with a non-porous or high-density foam. Once dispensing of the foam has been completed, the orbital debris 50 at least partially covered in foam is released from the collecting zone. The foam alters the orbit of the orbital debris 50 from a stable LEO orbit to a decaying orbit that will eventually end with the orbital debris 50 entering the Earth's atmosphere. In this manner, the debris collecting apparatus is able to dispose of more pieces of debris 50 per cycle (a cycle being defined as the operation time between refueling, or in the case of no refueling, the lifespan of the apparatus).

One or more components of the debris collecting apparatus 100, 200, 300, 1000 may be comprised of one or more types of metal, such as steel or aluminum, or one or more types of plastic, and/or carbon fiber or carbon fiber composite.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A method for collecting orbital debris using a debris collecting apparatus, the method comprising:
    detecting a distance between a piece of orbital debris and a front end of the debris collecting apparatus;
    activating an electromagnet when the detected distance reaches a predetermined value;
    controlling a strength of the electromagnet depending on a size of the debris and the detected distance of the debris from the electromagnet, wherein the electromagnet acts to slow rotation of the orbital debris and attract the orbital debris to a collecting zone, wherein the collecting zone is bounded at one end by the electromagnet;
    deactivating the electromagnet once the rotation of the orbital debris has stopped and the orbital debris is positioned in the collecting zone;
    securing the orbital debris;

changing an orbit of the debris collecting apparatus to a decaying orbit in order to move the debris collecting apparatus out of Low-Earth Orbit (LEO) and closer to Earth, configuring the debris collecting apparatus to remain in the decaying orbit until a predetermined altitude is reached;

releasing the orbital debris from the collecting zone to continue along the decaying orbit such that the orbital debris enters Earth's atmosphere; and moving the debris collecting apparatus out of the decaying orbit and returning the debris collecting apparatus to a stable LEO.

2. The method of claim 1, wherein the detecting of the piece of orbital debris is done using one or more sensors and cameras, wherein the one or more sensors and cameras are configured to communicate with at least one processor.

3. The method of claim 2, wherein the at least one processor is configured for bidirectional communication with a controller on Earth's surface to enable control of one or more components of the debris collecting apparatus from Earth.

4. The method of claim 1, wherein the securing the orbital debris comprises contacting the orbital debris with one or more collecting extensions.

5. The method of claim 1, wherein after releasing the orbital debris, the debris collecting apparatus returns to LEO at a predetermined position.

6. A debris collecting apparatus comprising:
a body extending along a body axis from a first end to an opposing second end;
a propulsion source configured to propel the body;
a collecting device positioned at the first end, the collecting device comprising,
an electromagnet directly coupled to the body, and
a plurality of extensions positioned around the electromagnet, wherein each of the plurality of extensions is configured to move relative to each other and the body;
at least one rechargeable power source in electrical communication with each of the plurality of extensions and the electromagnet;
at least one solar array coupled to the body and comprising a plurality of solar panels, wherein the at least one solar array is in electrical communication with the at least one rechargeable power source; and
a collecting zone bounded by the electromagnet, a portion of the body and the plurality of extensions.

7. The debris collecting apparatus of claim 6, wherein at least one of the plurality of extensions comprises a dispenser.

8. The debris collecting apparatus of claim 6, further comprising at least one sensor positioned on the body and configured to determine a distance from a piece of orbital debris.

9. The debris collecting apparatus of claim 6, wherein at least two of the plurality of extensions further comprises a contacting element positioned at a distal end of the at least two of the plurality of extensions and configured to contact a piece of orbital debris.

10. The debris collecting apparatus of claim 6, wherein the body further comprises a skirt configured to at least partially define the collecting zone.

11. The debris collecting apparatus of claim 6, wherein orbital debris is configured to be positioned and released to enter Earth's atmosphere.

12. The method of claim 1, wherein the securing of the orbital debris is done using a plurality of extensions positioned around the electromagnet and defining one or more sides of the collecting zone.

13. The debris collecting apparatus of claim 6, wherein at least one of the plurality of solar panels is configured to pivot relative to the body.

14. The debris collecting apparatus of claim 10, wherein the skirt is coupled to the body.

15. The debris collecting apparatus of claim 6, wherein at least one of the plurality of extensions comprises a first portion, a second portion and a third portion, wherein the first portion is configured to be coupled to the body.

16. The debris collecting apparatus of claim 15, wherein the first portion is moveably coupled to the second portion at an opposing end, and wherein the second portion is moveably coupled to the third portion.

17. The debris collecting apparatus of claim 15, wherein the third portion comprises a securing element configured to engage orbital debris.

18. The debris collecting apparatus of claim 6, wherein:
activation of the electromagnet acts to slow a rotation of orbital debris and attract the orbital debris to the collecting zone,
the electromagnet is deactivated once the rotation of the orbital debris has stopped, and the orbital debris is secured by at least one of the plurality of extensions.

19. The method of claim 1, further comprising refueling the debris collecting apparatus in the orbit.

* * * * *